(12) United States Patent
Younkin

(10) Patent No.: US 7,021,587 B1
(45) Date of Patent: Apr. 4, 2006

(54) DUAL CHANNEL FAIL-SAFE SYSTEM AND METHOD FOR ADJUSTING AIRCRAFT TRIM

(75) Inventor: James R. Younkin, Springdale, AR (US)

(73) Assignee: Trutrak Flight Systems, Inc, Springdale, AR (US)

( * ) Notice: Subject to any disclaimer, the term of this patent is extended or adjusted under 35 U.S.C. 154(b) by 29 days.

(21) Appl. No.: 10/753,884

(22) Filed: Jan. 7, 2004

(51) Int. Cl.
*G05D 1/00* (2006.01)

(52) U.S. Cl. ...................................... 244/178; 244/99.3

(58) Field of Classification Search ............. 244/76 R, 244/178, 194, 195, 99.2, 99.3; 701/3, 4
See application file for complete search history.

(56) References Cited

U.S. PATENT DOCUMENTS

| | | | |
|---|---|---|---|
| 3,328,548 A | | 6/1967 | Younkin et al. |
| 3,598,999 A | * | 8/1971 | Hofmeister ................. 250/204 |
| 3,936,715 A | | 2/1976 | Nixon et al. |
| 4,281,811 A | | 8/1981 | Nixon |
| 4,291,260 A | | 9/1981 | Nixon |
| 4,304,375 A | | 12/1981 | Builta |
| 4,442,490 A | | 4/1984 | Ross |
| 4,583,030 A | | 4/1986 | Nixon |
| 4,684,085 A | * | 8/1987 | Berwick et al. ............ 244/178 |
| 4,758,958 A | | 7/1988 | Gersdorf |
| 5,012,423 A | * | 4/1991 | Osder ......................... 701/116 |
| 5,686,907 A | * | 11/1997 | Bedell et al. ............... 340/945 |

* cited by examiner

*Primary Examiner*—Peter M. Poon
*Assistant Examiner*—T D. Collins
(74) *Attorney, Agent, or Firm*—James Richards

(57) ABSTRACT

A system for providing automatic trim control associated with a control surface in an aircraft that utilizes at least two sensors that must agree in direction before trim adjustment is made. Each sensor is provided with a separate an independent controller channel to further enhance fail-safe operation. A trim sensor is placed in the coupling link between a servo and aircraft primary control linkage leading to the associated control surface. A trim sensor is provided that utilizes a spring with a portion disposed laterally with respect to the direction of the force to be measured. An arm is attached to the lateral portion of the spring to effect motion that can be sensed by various sensors including optical, mechanical switch and magnetic sensors.

29 Claims, 26 Drawing Sheets

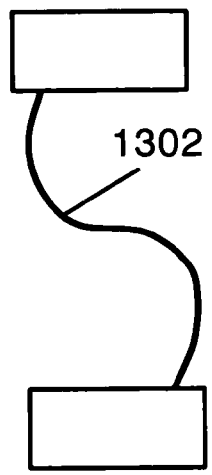 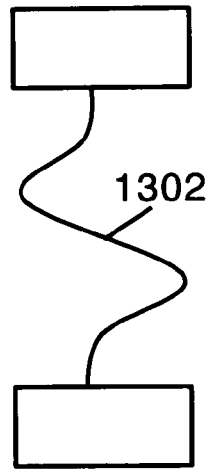 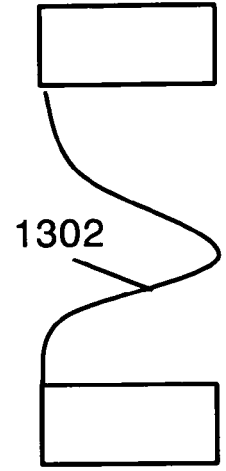 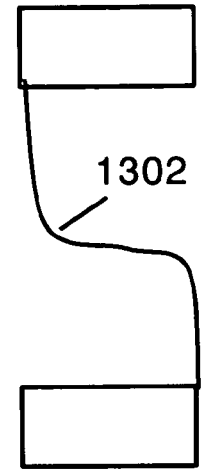
Fig. 16A  Fig. 16B  Fig. 16C  Fig. 16D
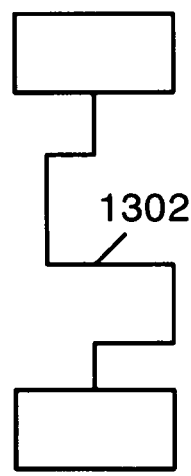 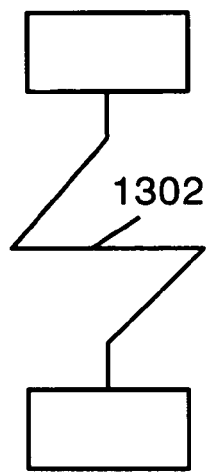 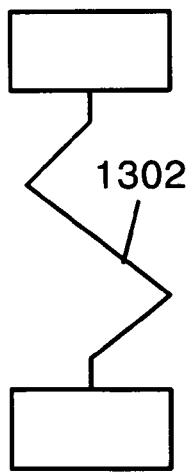 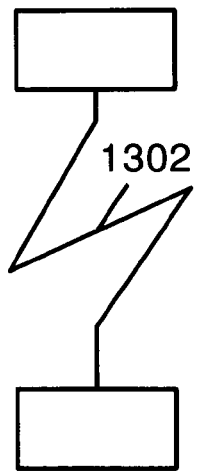
Fig. 16E  Fig. 16F  Fig. 16G  Fig. 16H

DUAL CHANNEL FAIL-SAFE SYSTEM AND METHOD FOR ADJUSTING AIRCRAFT TRIM

FIELD OF THE INVENTION

The present invention pertains to the field of aircraft control systems, in particular to the control of aircraft trim.

BACKGROUND

Aircraft control is typically achieved through the manipulation of control surfaces located on the wings and tail surfaces of the aircraft. Typical control surfaces include the elevator, rudder and ailerons. When a control surface is moved, the aerodynamic forces acting on the control surface create a reaction force that is transmitted back through the control linkages to the pilot control yoke, giving the pilot a "feel" to the control of the aircraft. A pilot can immediately feel how much control is being exerted through the control yoke before the effect is manifested in a change in aircraft attitude. The control feedback is thus a valuable aid in the flying of an aircraft. However these aerodynamic reaction forces are not constant for all flying conditions, such as airspeed and altitude. This gives rise to a residual force or back pressure that must be maintained continuously in steady level flight. In some aircraft, this force may be substantial, potentially creating significant pilot fatigue. Further, if the pilot were to release the control momentarily, under these conditions, the aircraft may quickly enter an uncomfortable or potentially dangerous attitude. To counter the residual control force, various trim mechanisms may be installed to balance the residual force for a given flight condition. A trim tab installed on the control surface is a commonly chosen solution. The trim tab may be adjusted by the pilot to neutralize back pressure for a given flight condition.

Trim is also beneficial to the operation of an autopilot. If the aircraft is kept in trim, an autopilot servo will not need to deliver as much torque, allowing lower torque limit settings and lighter servos. Further, if the aircraft is in a trimmed state, engagement and disengagement of the autopilot will be smooth. But, if the aircraft is out of trim, there will likely be a sudden pitch up or down until the pilot can recognize the condition and make corrections. Such sudden pitching can be uncomfortable or even alarming to passengers.

A trim system, like all aircraft systems, must be designed with careful consideration for safety. The potential exists for an out of control trim system to place an aircraft in a trim state where it is difficult or impossible to maintain altitude. Thus, high reliability and fail-safe design are essential elements of an aircraft trim system. Therefore, there is a need for trim control systems that automatically adjust aircraft trim and incorporate fail-safe design principles.

BRIEF SUMMARY OF THE INVENTION

Briefly, the present invention is a system and method for providing automatic trim control for a control surface in an aircraft that utilizes at least two sensors that must agree in direction before trim adjustment is made. Each sensor is provided with a separate an independent controller channel to further enhance fail-safe operation. As a further aspect of the invention, a trim sensor is placed in the coupling link between a servo and aircraft linkage leading to the associated control surface. Further, a trim sensor is provided that utilizes a spring with a portion disposed laterally with respect to the direction of the force to be measured. An arm is attached to the lateral portion of the spring to effect motion that can be sensed by various sensors including optical, mechanical switch and magnetic sensors.

These and further benefits and features of the present invention will now be described in detail with reference to exemplary embodiments in accordance with the invention.

BRIEF DESCRIPTION OF THE DRAWINGS

The invention will now be described with reference to the following drawings. In the drawings, like numbers represent identical or similar components. The first digits of a reference number identify the drawing number wherein the reference first appears. In these drawings, when flow lines or wires cross perpendicular to one another, there is no implied connection. When a wire or signal line ends touching another line, there is an implied connection. In the drawings.

FIGS. 16A–16H illustrate alternative exemplary spring shapes in accordance with the present invention;

DETAILED DESCRIPTION OF THE INVENTION

Figure 1:
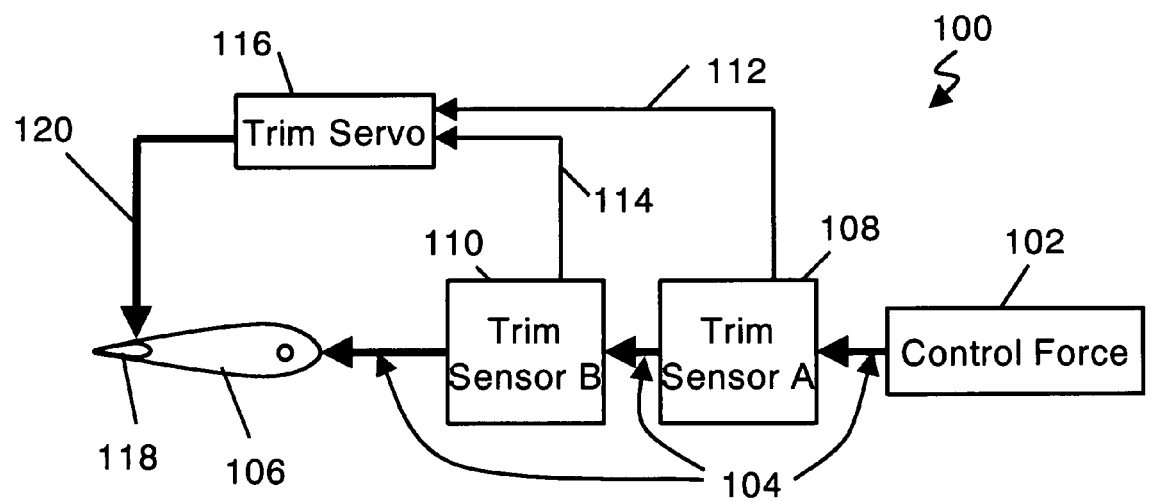
FIG. 1 is a block diagram of a trim system in accordance with the present invention.

The present invention is a system and method for automatic control of aircraft trim. The invention includes the use of dual trim sensors in a configuration that insures safe trim operation in the presence of certain device failures. This characteristic is known as "fail-safe." Typically, fail-safe operation allows for diminished operation or non-operation provided that unsafe operation is avoided.

Fail-safe operation may be evaluated by assessing the consequences of failure of each component of the system individually. A system may be considered fail safe if, for any single component failure, the system operates substantially correctly or fails in a reasonably safe manner. A double component failure analysis is avoided because single component failures will dominate the failure analysis under certain conditions. The probability of a double component failure is the product of the individual probabilities of the separate and independent individual failures. Thus, if each individual probability of failure is very low (for example, 0.00001), then the probability of a double failure would be extremely low (for example, 0.000000001). Since the probability of failure includes the time of operation, a further condition is imposed requiring that the single failures be detectable (and would presumably be corrected soon after being detected) to limit the time under which a double failure may occur.

If a single failure is not detectable, the failure may be compounded with other failures before a fault becomes apparent. A further requirement in the analysis is that the failures be independent, i.e. a single failure does not cause or hasten the second failure and the two failures are not dependent on a common element or signal.

Thus, the rule may be stated as follows:

1. No single failure shall produce unsafe operation.
2. Any single failure must be detectable.
3. The failures must be independent.

In a trim control system, fail-safe operation means that for any likely failure of the trim control apparatus, the trim system will continue to operate correctly or will stop movement at its present position. The unsafe operation to be avoided is an unlimited movement of the trim servo to or past its extreme position, especially when the movement is at maximum speed. The unlimited trim movement is termed a runaway trim. Such a failure might occur in a conventional design with an open circuit trim sensor failure. The open circuit could result in a false indication of maximum control force and result in a maximum rate movement of the trim until a mechanical stop is reached or power is removed from the system. Such extreme trim may result in loss of control of the aircraft, depending on the particular aircraft design and flight conditions.

The present invention greatly reduces the likelihood of a runaway failure by requiring that at least two trim sensors agree in direction to produce a change in trim setting. Thus, if one trim sensor fails, the trim will not move opposite to the direction called for by the remaining working sensor.

The invention may be more fully understood with reference to FIG. 1. FIG. 1 is a block diagram of a trim system 100 in accordance with the present invention. Referring to FIG. 1, a control force 102 operates through control linkages 104 and couplings to control a control surface 106. Two trim sensors, trim sensor A 108 and trim sensor B 110, are coupled to the control linkage 104 to measure the control force 102. The trim sensors 108 and 110 each produce a trim signal, 112 and 114 respectively, that is coupled to a trim servo 116. The trim servo 116 drives a trim tab 118 through the trim linkage 120 only when both trim sensors 108 and 110 agree in direction. The trim tab 118 is moved by the trim servo 116 in the direction that reduces the control force 102 and continues to move in such direction until the control force 102 is zero or near zero. The trim servo 116 is typically a motor driving through a gear train, thus resulting in a trim position that is a function of the integral of the trim servo 116 input. Alternatively, trim position may be determined by a force generating servo.

Figure 2:
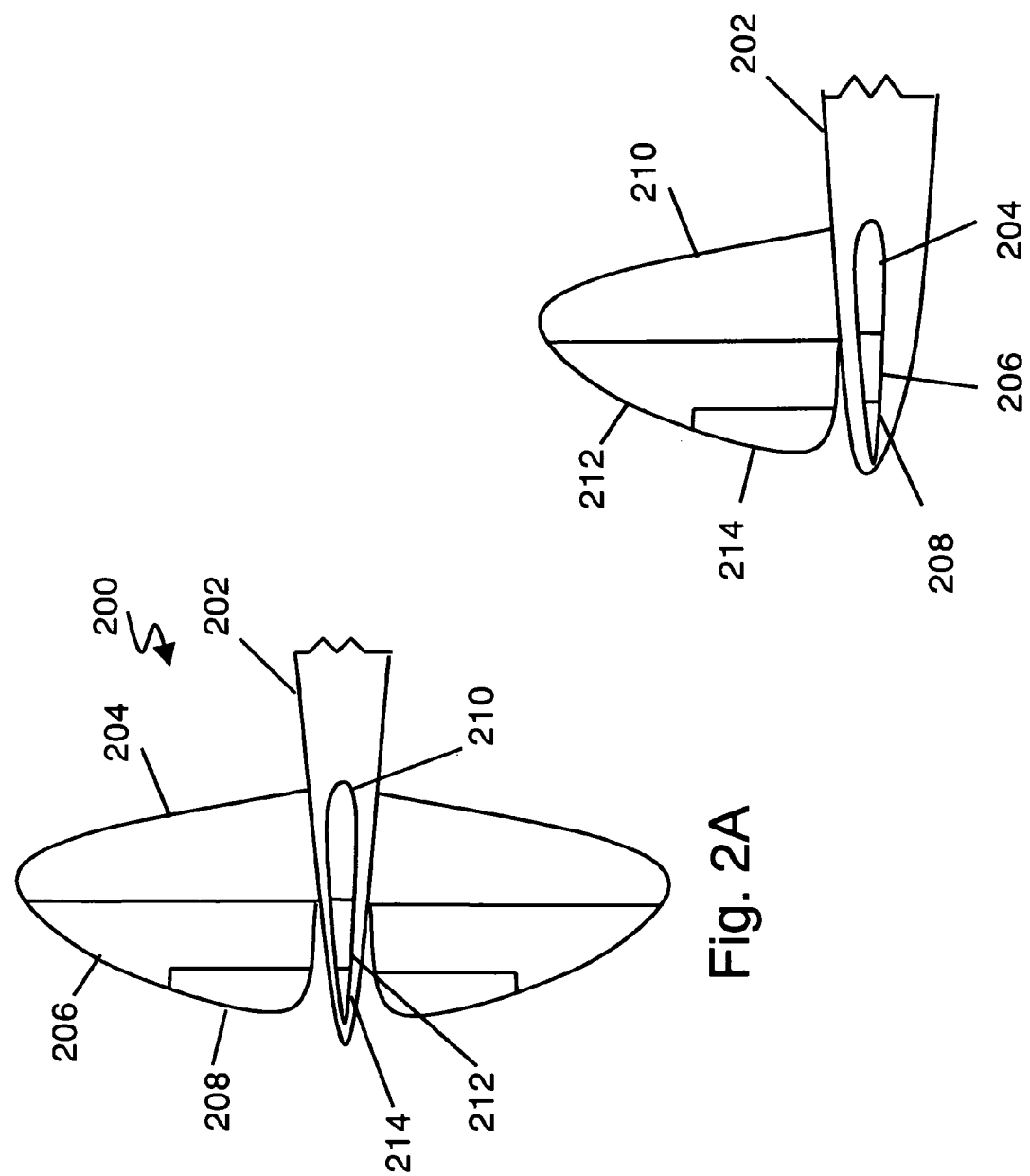
FIG. 2A is a top view of a typical aircraft tail section showing control surfaces and trim tabs.
FIG. 2B is a side view of a typical aircraft tail section showing control surfaces and trim tabs.

FIG. 2A is a top view of a typical aircraft tail section 200 showing control surfaces 106 and trim tabs 118. Referring to FIG. 2A, a horizontal stabilizer 204 is mounted to the fuselage 202. The horizontal stabilizer 204 provides vertical axis (pitch axis) stability for the aircraft. An elevator 206, which is one of the control surfaces 106, is mounted to the horizontall stabilizer 204. The elevator 206 may be rotated up or down to alter the vertical attitude of the aircraft to enable the aircraft to climb or descend. Deflecting the elevator 206 away from its center position requires a control force 102 to overcome the airflow over and under the elevator 206. Because different flight conditions require slightly different steady state elevator 206 positions, an elevator 206 trim tab 208 is provided to balance the residual force required to maintain each steady state position. A manual trim may be adjusted, through trim linkages, by the pilot. (The linkage path to the pilot's manual control is not shown) An automatic trim is typically adjusted by a trim servo 116. In a manual electric trim, the pilot directly commands the trim servo 116 using a switch.

FIG. 2B is a side view of a typical aircraft tail section 200 showing control surfaces 106 and trim tabs 118. Referring to FIG. 2B, a vertical.1 stabilizer 210 is mounted to the fuselage 202. A rudder 212, which is one of the control surfaces 106, is mounted to the vertical stabilizer 210 and may be rotated to adjust the yaw (right to left) axis of the aircraft. The rudder 212 is used in combination with the ailerons (not shown) to effect coordinated turns and level flight. The rudder 212 may, like the elevators 206, have a residual control force 102 in a steady state flight condition, and a rudder 212 trim tab 214 may be provided to balance this force. Likewise, the ailerons (not shown) on the wings may have residual forces, which may be balanced by trim tabs 118. Trim may also be balanced by varying a spring coupled to the control linkage. Pitch trim may be also adjusted tilting the horizontal stabilizer. Other aircraft types, such as canard designs or helicopters have other control surfaces 106 that may also utilize trim tabs 118 or other trim mechanisms. The present invention may be utilized for any trim application.

Figure 3:
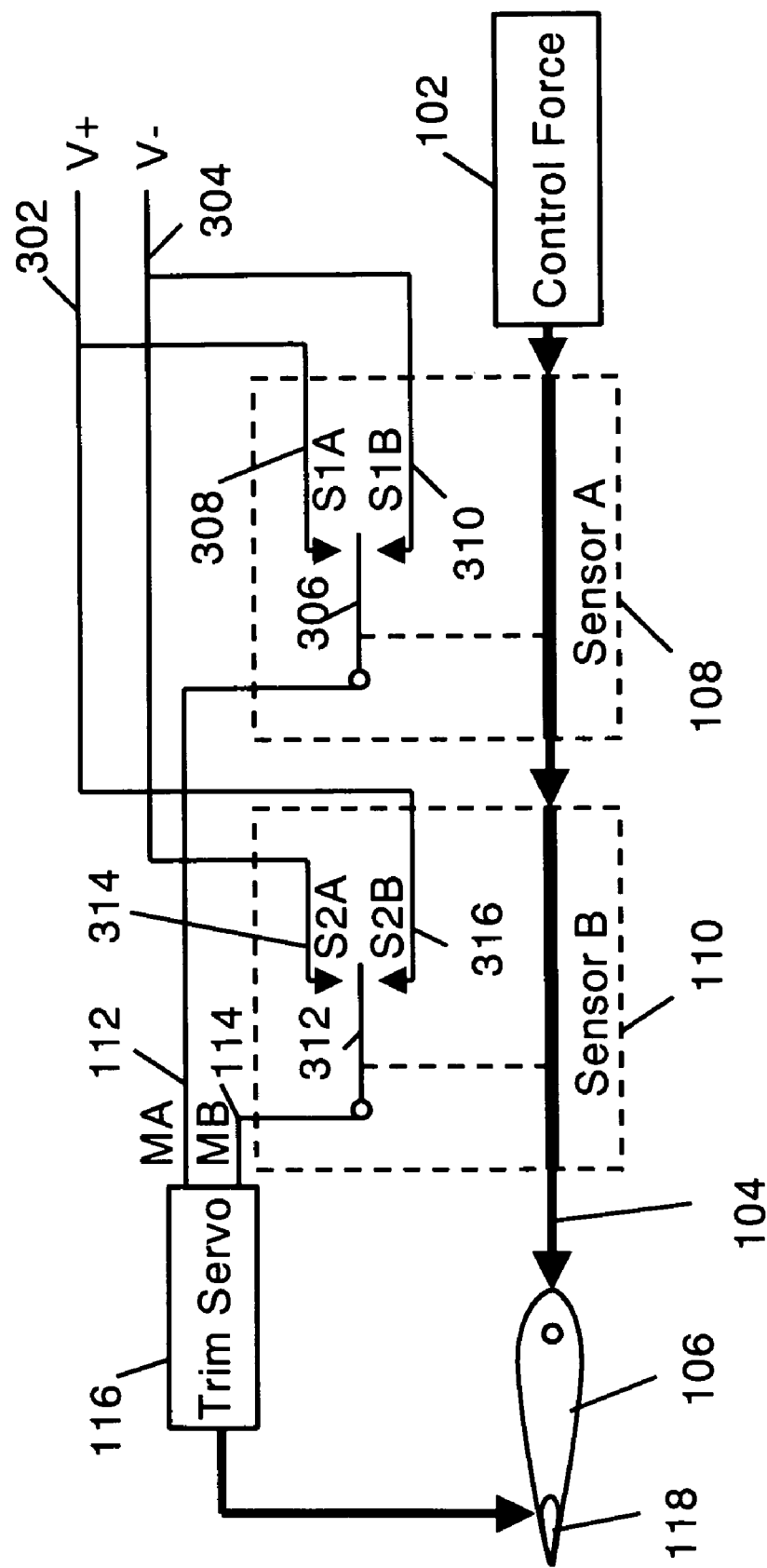
FIG. 3 is a block diagram of one embodiment of the system of FIG. 1 utilizing a switching trim sensor.

FIG. 3 is a block diagram of one embodiment of the system of FIG. 1 utilizing a switching trim sensor. Referring to FIG. 3, the control force 102 is coupled through trim sensor A 108 and Trim sensor B 110 to the control surface 106. Trim sensor A 108 and Trim sensor B 110 incorporate a three-position switch arrangement. When the control force 102 is near zero, the switches, switch1 306 and switch2 312 are in a central open position. When the control force 102 is a compressive force, switch1 306 closes contact S1A 308 and switch2 312 closes contact S2A 314, connecting servo lead MA 112 to V+, the positive supply 302, and servo lead MB 114 to V−, the negative supply 304, respectively, thus operating the trim servo 116 to move the trim tab 118 in a direction to reduce the residual control force 102 required to maintain control surface 106 position. The trim servo 116 runs until contact S1A 308 or contact S2A 314 opens. Conversely, when the control force 102 is a tensile force, switch contacts S1B 310 and S2B 316 are closed connecting servo lead MA 112 to V− and servo lead MB 114 to V+, thus operating the trim servo 116 in the opposite direction, which is in the direction to reduce the residual control force 102. This movement continues until the control force 102 is near zero resulting in the opening of either S2A 314 or S2B 316.

An analysis of the fail-safe property of the system will now be made with the aid of FIG. 3. The fail safety analysis will examine the combinations of likely failure modes for he two sensors, sensor A 108 and sensor B 110. Referring to FIG. 3, if one component of sensor A 108 fails in a manner that causes closure of contact S1A 308, there are three possible outcomes as a result of the states of sensor B 110, which is assumed to be operating correctly. If sensor B 110 is neutral as a result of near zero control force 102, contacts S2A 314 and S2B 316 would be open and there would be no operation of the servo, which is the correct state for the assumed control force 102 input. If the control force 102 were compressive, contact S2A 314 would be closed and the servo would operate in the correct direction. If, however the control force 102 were tensile, contact S2B 316 would close, connecting both servo lead MA 112 and lead MB 114 to V+, producing no motion. Whereas, this is not the correct response for the given control force 102, this response does not result in a runaway trim state. The trim will remain in a static position, which is assumed to be a safe operating position. Further, the failure would be detectable in normal operation by the absence of trim control in one direction.

A failure of a component of Sensor A 108 that causes Switch1 306 to remain open likewise prevents trim motion and does not cause a runaway condition. A failure of a component of Sensor A 108 that causes a closure of contact S1B 310 is analogous to the case wherein a failure caused closure of contact S1A 308, i.e. the trim becomes inoperative (stationary) in one direction and does not run away.

In a similar manner, failures of Sensor B 110 can be evaluated. The analysis is analogous to the failures of Sensor A 108, resulting also in the conclusion that the failures prevent movement of the servo and do not result in a runaway condition. In addition, the failure is detectable because trim will not move in one direction. Further, since the trim sensors are separate with no common components, failures of Sensor A 108 are independent from failures in Sensor B 110. Thus, the architecture of FIG. 3 meets the basic criteria for fail-safe operation.

An alternative embodiment can be generated by substituting one or more of the switches in FIG. 3 with a switch that has no center off position, i.e. a SPDT (single pole double throw) switch. It can be appreciated that the system using SPDT switches will also pass a fail-safe analysis. Further, if the SPDT switch or switches have hysteresis and/or do not have exactly the same center switching position with respect to one another relative to the input control force 102, a center off state will develop, i.e., the trim servo 116 will be off when the control force 102 is near zero. This is because there will be a small range of control force 102 wherein the two switches, Switch1 306 and Switch2 312, disagree in direction and thus prevent motion of the trim servo 116. The center off state has an advantage of not running the trim servo 116 motor continuously, thereby reducing wear on the motor and switches.

In another embodiment, a single pole single throw (SPST) switch may be used to sense the direction (polarity) of the control force 102 to control a relay or other controllable switch having SPDT characteristics. The relay is then substituted for switch1 306 in FIG. 3.

Figure 4:
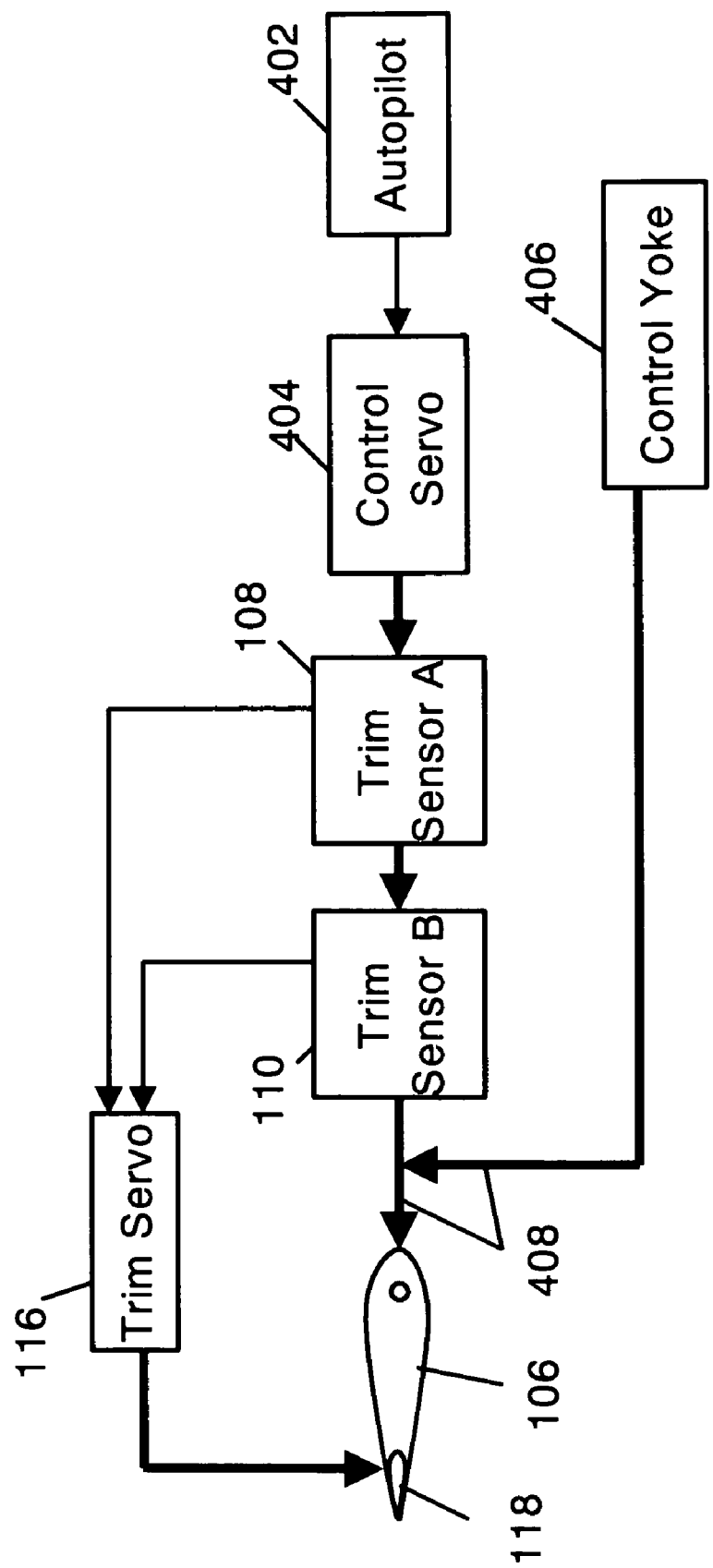
FIG. 4 is a block diagram of one embodiment of the system of FIG. 1 including a control servo.

FIG. 4 is a block diagram of one embodiment of the system of FIG. 1 including a control servo 404. Referring to FIG. 4, an autopilot 402 controls a control servo 404, which may be an elevator 206 servo, rudder 212 servo, aileron servo or other control servo 404. The control servo 404 is coupled to the control surface 106 through linkages 104 that may incorporate or be coupled to two trim sensors, trim sensor A 108 and Trim sensor B 110. The control surface 106 is also coupled to a control yoke 406 or control stick 406 for pilot control of the control surface 106. The linkage that couples the control surface 106 to the pilot control yoke 406 is the primary control 408. Trim sensor A 108 and Trim sensor B 110 are coupled to the trim servo 116. The Trim servo 116 operates only when trim Sensor A 108 and Trim Sensor B 110 agree in direction.

The two trim sensors 108 or 110 may be located in the control servo 404 or in the control linkages 104 where the control force 102 can be measured. The two trim sensors 108 or 110 may be identical or may be of different types. In one embodiment, one trim sensor 108 or 110 is an electromechanical force sensor included a link which couples a control servo 404 to the aircraft control linkage 104. In another embodiment, one trim sensor 108 or 110 is an electromechanical torque sensor housed within the control servo 404. In still another embodiment, one trim sensor 108 or 110 is an electronic circuit that measures control servo 404 motor current or voltage as an estimate of motor output torque, which is proportional to the control force 102 to be trimmed to zero.

Figure 5:
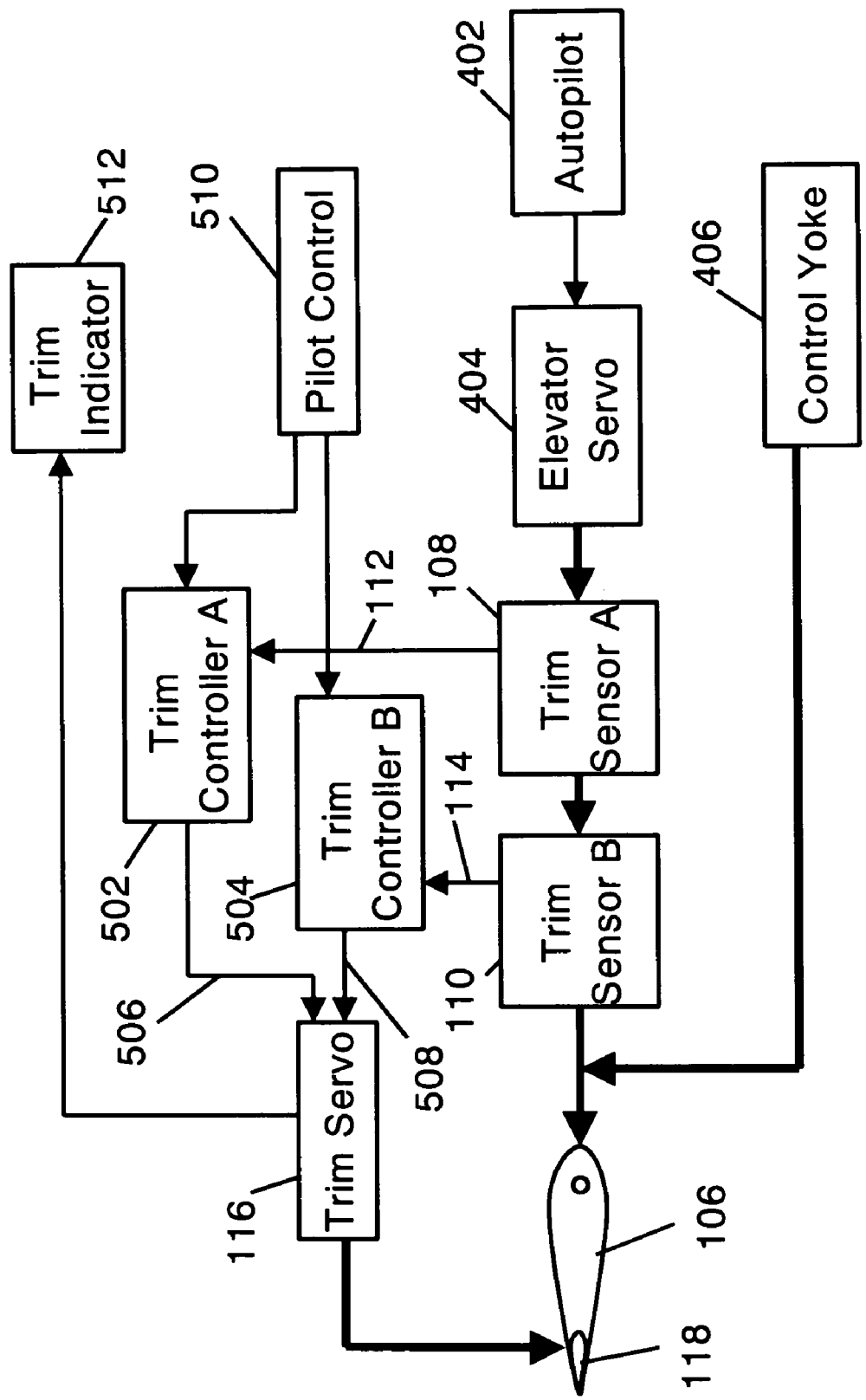
FIG. 5 is a block diagram of one embodiment of the system of FIG. 4 including a trim controller.

FIG. 5 is a block diagram of one embodiment of the system of FIG. 4 including a trim controller. Referring to FIG. 5, the autopilot 402, control servo 404, control surface 106, and control yoke 406 operate in much the same manner as described in FIG. 4. Trim sensor A 108 provides a signal 112 to trim controller A 502 which in turn provides an A output 506 that drives one input to the trim servo 116. Trim sensor B 110 provides a signal 114 to trim controller B 504, which in turn provides a B Output 508 that drives a second input to the trim servo 116. In keeping with the fail-safe criteria, trim controller A 502 and trim controller B 504 are substantially separate and independent units such that no single failure will be common to both controllers and result in a runaway condition. The failures usually considered in this analysis are open and short of active and passive components. Thus trim controller A 502 and trim controller B 504 should not generally use op amps, comparators, or logic that is contained in the same chip package, and should not depend on the same sensor signal or component; however controller A 502 and controller B 504 may, for example, be constructed on the same circuit board or may share a connector as long as different pins are used.

As shown in FIG. 5, two separate and independent channels comprising the associated trim sensors and trim controllers are provided. Separate and independent as used in this specification means separate and independent with respect to potential failures, i.e., each separate and independent channel is not subject to failures in the alternate channel, e.g. the channel comprising trim sensor A 108 and trim controller A 502 is not subject to failures in the channel comprising trim sensor B 110 and trim controller B 504.

The trim controller may provide features and functions to enhance the trim system 100. Some of these features may include, for example, drivers and amplifiers for the trim sensor, linear or pulsed output drivers for the servo, pilot command input from a trim switch and transfer logic (or relay) to select between pilot trim control and automatic trim control, and other features as may be needed for a particular installation.

Shown also in FIG. 5 is an optional pilot control trim switch 510 input to the trim controllers to operate the trim manually. In one embodiment, when a pilot presses a trim up button or trim down button, the pilot command overrides the trim sensor logic. In an alternate embodiment, when the autopilot 402 is on, the trim sensors are in control of the trim servo 116 and when the autopilot 402 is off, the pilot control trim switch 510 is in control of the trim servo 116.

An optional trim indicator 512 is shown in FIG. 5 to display the trim position to the pilot.

Figure 6A:
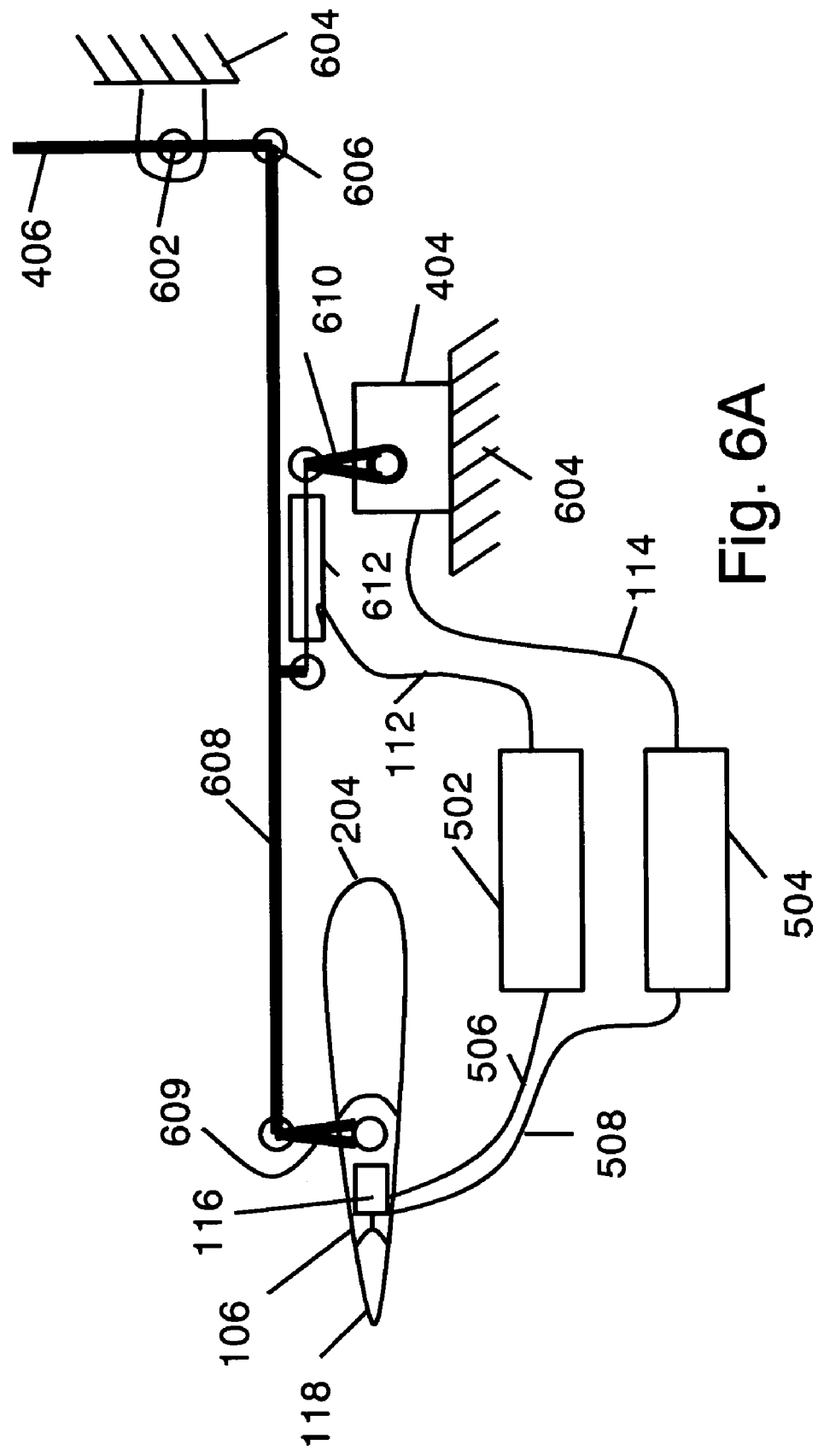
FIG. 6A is a diagram showing one embodiment of the invention.

FIG. 6A is a diagram showing one embodiment of the invention. Referring to FIG. 6A, a control stick 406 is mounted on a pivot bearing 602 which is fixed to the airframe 604. The control stick 406 is coupled to a push pull tube 608 through a bearing 606. The push pull tube 608 is further coupled through a bearing to the elevator 206. Thus, when the control stick 406 is pulled back by the pilot, the elevator 206 deflects upward, pushing the tail of the aircraft down thereby directing the aircraft axis upward. The embodiment of FIG. 6A is described with reference to the elevator 206; however, other control surfaces 106 may be adapted in accordance with the teaching of FIG. 6A.

A control servo 404 is mounted on the airframe 604. A servo output arm 610 is coupled to a sensor link 612 which incorporates a trim sensor. The sensor link 612 is coupled through a bearing to the push pull tube 608 and thereby coupled to a control arm 609 to move the control surface 106. The sensor link 612 output 112 is coupled to trim controller A 502. The controller A output 506 drives the trim servo 116. The control servo 404 includes a torque sensor that is used as the trim sensor B 110. The servo torque sensor output 114 is coupled to trim controller B 504. The B output 508 drives the trim servo 116. The trim servo 116 may be mounted inside the elevator 206 as shown in FIG. 6. Other locations for the trim servo 116 may be utilized as are known in the art. The trim servo 116 drives the trim tab 118.

The link trim sensor and the servo trim sensor (torque sensor) correspond to trim sensor A 108 and trim sensor B 110 in FIGS. 1, 3, 4, and 5. The two trim sensors do not need to be physically in series and do not need to be the same type. The order does not matter.

Figure 6B:
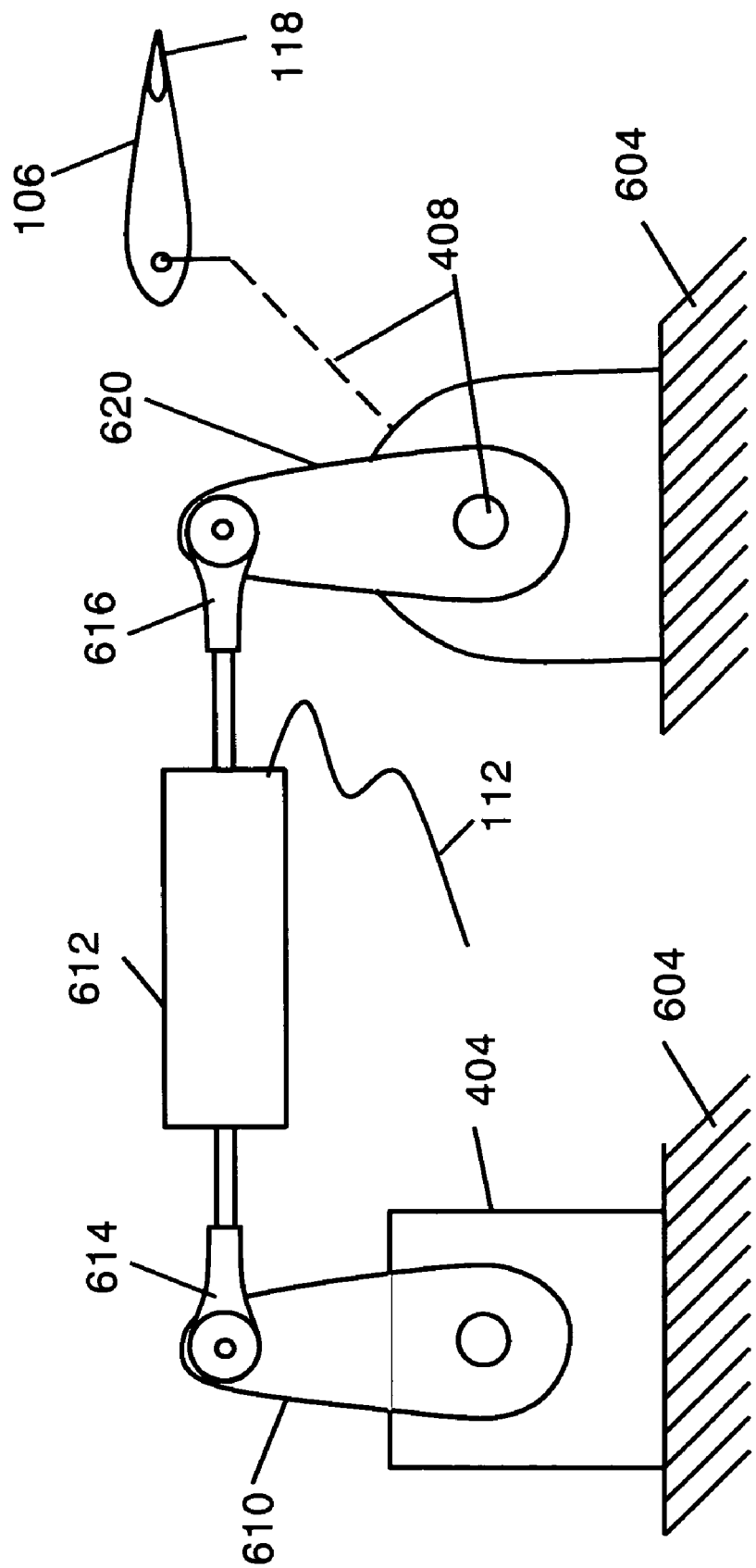
FIG. 6B is an exemplary diagram of a trim sensor in the coupling link between the servo and the primary control of the aircraft.

FIG. 6B is an exemplary diagram of a trim sensor in the coupling link between the servo and the primary control 408 of the aircraft. FIG. 6B shows a control servo 404 mounted to the airframe 604. The control force 102 output of the control servo 404 is delivered through an output arm 610 which is coupled to a push-pull rod, or coupling link, through a first rod end bearing 614. The coupling link includes the trim sensor. The control force 102 is coupled through a second rod end bearing 616 to a control arm 620 which is fixed to the primary control 408 of the aircraft. The primary control 408 of the aircraft includes linkages and coupling mechanisms that couple the control yoke 406 or control stick 406 (not shown) to the control surface 106. Thus, coupling the servo to the primary control 408 for the control surface 106 will couple the servo to the control surface 106. The sensor output signal 112 is delivered to the trim servo 116 or trim controller 502.

Placing the trim sensor 108 between the control servo 404 and primary control 408 has multiple advantages. For a dual sensor system, the complexity of a control servo 404 design is simplified by requiring only one or no trim sensors 108 to be designed into the control servo 404. Requiring two independent trim sensors 108 to be designed into one control servo 404 increases control servo 404 complexity and size. Torque sensors often require slip ring assemblies, extra gears, or flexible members. Since control servos 404 may be mounted in tight locations, size is a premium. A further advantage of the sensor being in the link between the servo and primary control 408 is that the primary control 408 need not be altered when installing an automatic trim system 100 in the field (after aircraft manufacture), thus preserving the integrity of the primary control 408. A further advantage is that the trim system 100 may be installed in association with an existing autopilot 402 and servo where the control servo 404 contains no trim sensor 108. In the case where the control servo 404 contains no trim sensor 108, two trim sensors 108 may be installed in series (mechanically) in the same link. Alternatively, if the trim system 100 is such that a runaway failure of the trim system 100 cannot result in a dangerous condition, a single trim controller or single trim sensor 108 may be used.

Figure 6C:
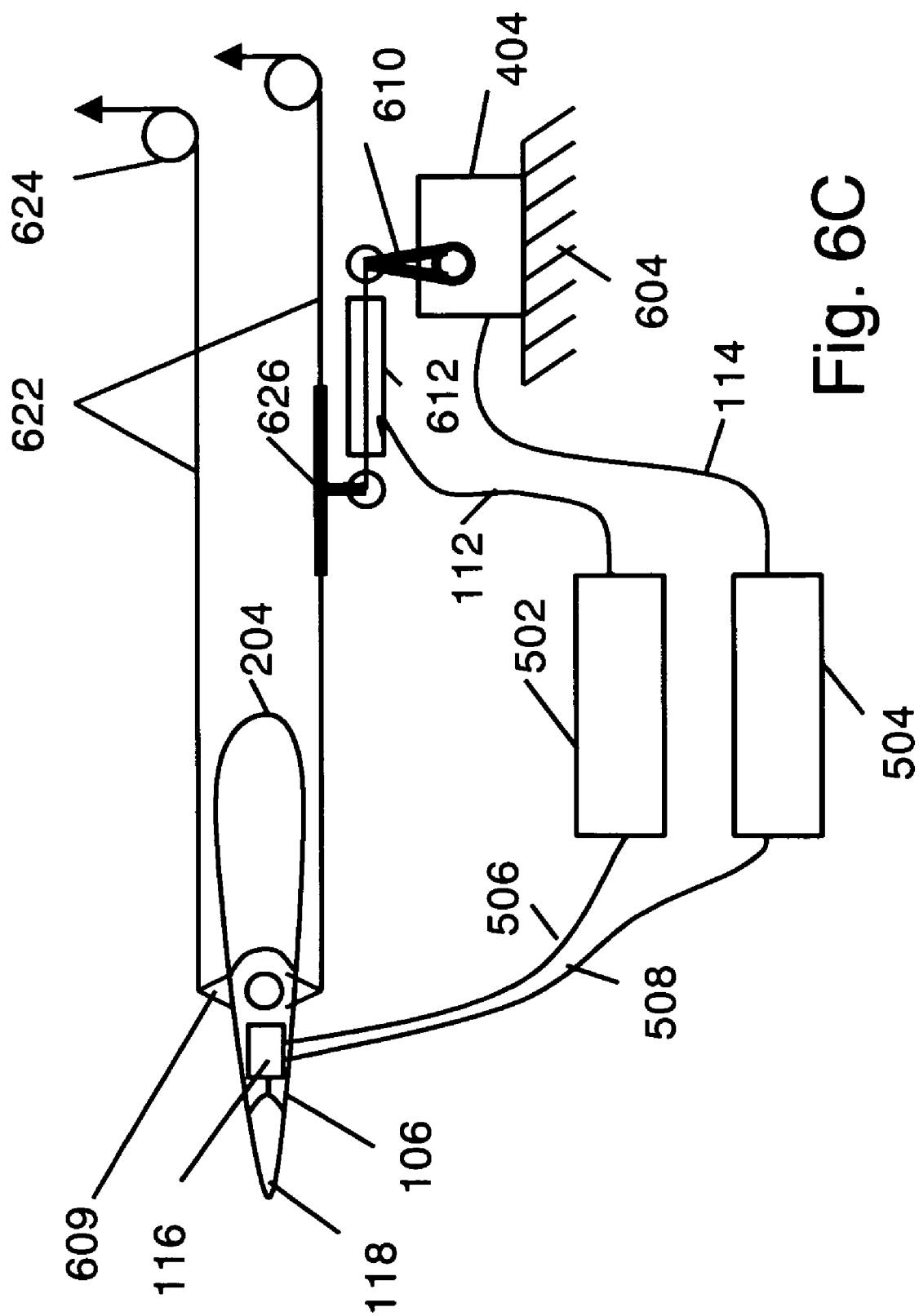
FIG. 6C is a diagram of the system of FIG. 6A wherein the control servo is coupled through a sensor link to a control cable.

FIG. 6C is a diagram of the system of FIG. 6A wherein the control servo 404 is coupled through a sensor link 612 to a control cable 622. Referring to FIG. 6C, the control stick 406 drives a control cable 622, which is routed through cable pulleys 624 to drive an arm 609 or bell crank on the control surface 106 to rotate the control surface 106. The mechanical coupling path from the control stick 406 (not shown) to the control surface 106 is the primary control 408 path. The control servo 404 drives the control cable 622 through a sensor link 612 and a cable attaching device 626. The sensor link 612, thus forms part of the coupling from the control servo 404 to the primary control 408.

The arrangement of FIG. 6C is especially advantageous for installation of the control servo 404 and sensor link 612 after the original manufacture of the aircraft because of the minimal impact on the original primary control 408.

Figure 6D:
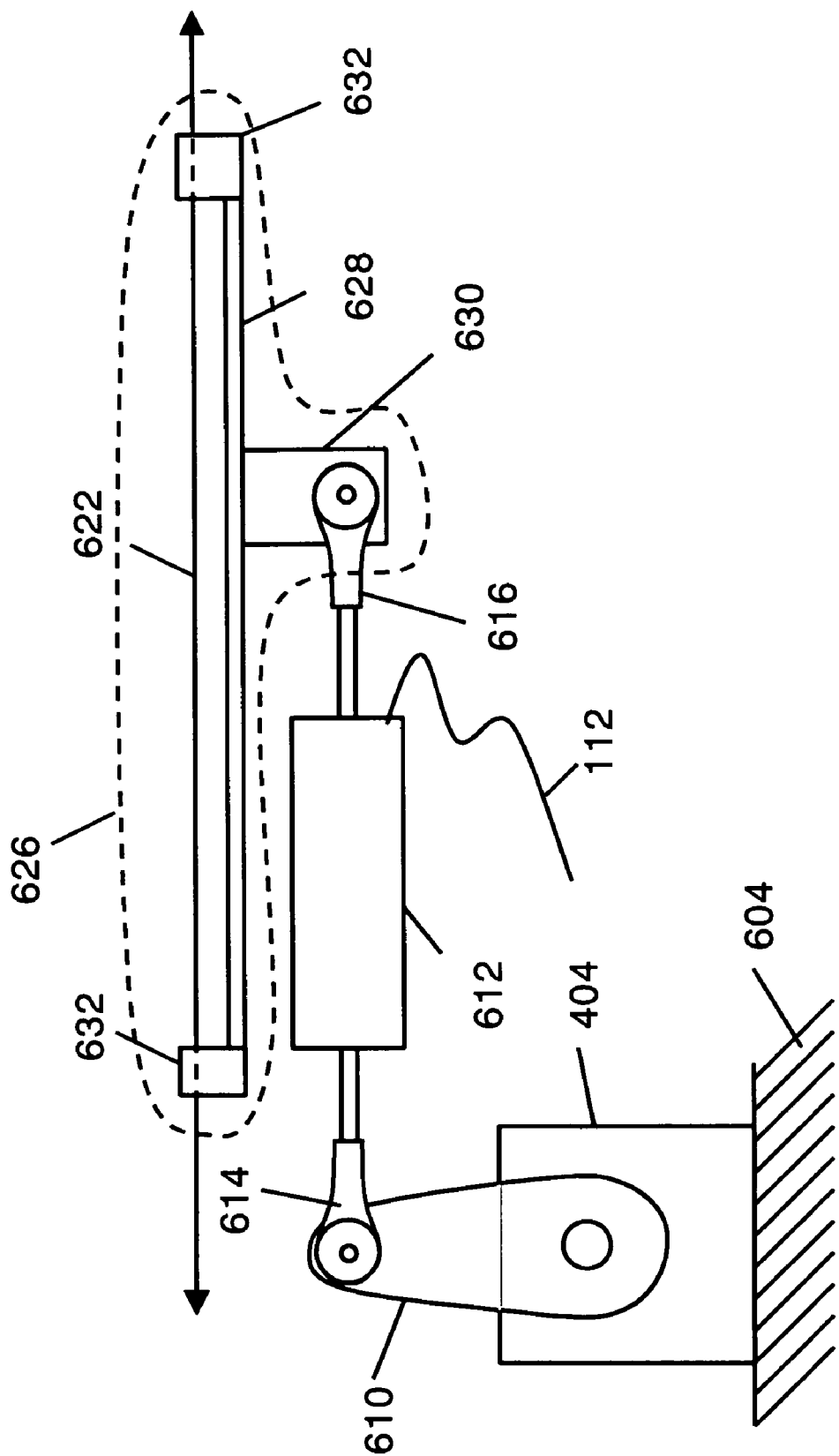
FIG. 6D illustrates the cable attaching device of FIG. 6C in greater detail.

FIG. 6D illustrates the cable attaching device 626 of FIG. 6C in greater detail. The cable attaching device 626 is designed to minimize flexing of the cable in response to driving force from the servo through the sensor link 612. Cable flexure introduces undesirable lost motion in the in the path from the control servo 404 to the control surface 106. Referring to FIG. 6D, the control servo 404 drives the control cable 622 through a sensor link 612 and a cable attaching device 626. The cable attaching device 626 comprises a bar 628, a tab 630, and two cable clamps 632. The tab 630 includes a shaft for coupling to the second rod end bearing 616. The tab 630 is fixed to the bar 628, which is attached to the control cable 622 at each end using a cable clamp 632. The bar 628 is of sufficient length to minimize cable flexing resulting from the off center drive, i.e. the rod link drives the tab 630 at a point that is off the center axis of the control cable 622, thus producing a torque tending to flex the control cable 622. Greater bar 628 length reduces the cable flexing.

For best operation, the sensor link 612 runs substantially parallel to the control cable 622; the second rod end bearing 616 should be as close as practical to the control cable 622; and the first rod end bearing 614 should be as close as practical to the control cable 622. Also, a control cable 622 constraint, such as a cable pulley 624, should be close to the cable attaching device 626. In a typical installation, the bar 628 may be 25 cm in length. In an alternative embodiment, the cable clamps 632, bar 628, and tab 630 may be formed as a single unit wherein the bar 628 includes a channel for receiving and clamping the control cable 622 and the bar 628 is if sufficient width to attach the second rod end bearing 616.

In an alternative embodiment (not shown), control cable 622 flexing is minimized by using a fixed connection at the cable end of the sensor link 612. The bar 628 is made short and may comprise only one cable clamp 632. In addition, the second rod end bearing 616 is eliminated and the sensor link 612 is fixed to the coupling device. The sensor link 612 is made as long as practical so that the angular variation of the sensor link 612 due to rotation of the control servo 404 output arm 610 is minimized. Thus, only a small amount of control cable 622 flexing will be produced and the flexing can be held within the tolerance limits of the cable.

Figure 7:
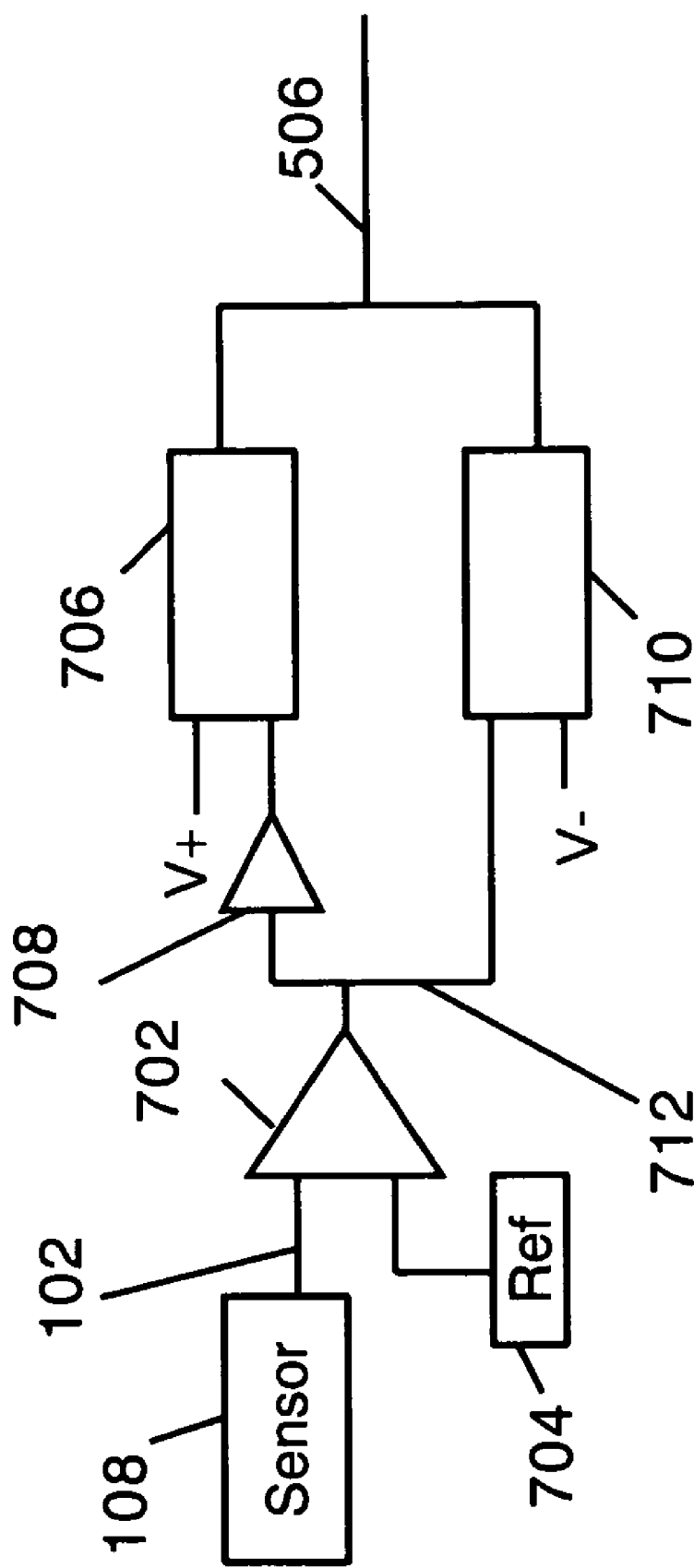
FIG. 7 is a block diagram of a trim controller in accordance with the present invention.

FIG. 7 is a block diagram of a trim controller in accordance with the present invention. The trim controller of FIG. 7 may be used as trim controller A 502 or trim controller B 504 or both. Referring to FIG. 7, the sensor, such as trim sensor A 108, provides a signal to an input comparator 702, which compares the signal level with a voltage reference 704 and provides a comparison signal 712 resulting from the comparison. The comparison signal 712 drives a positive driver 706 through an optional level shift stage 708. The positive driver 706 connects the controller A 502 output to V+ when the comparison signal 712 is high and disconnects the A output 506 from V+ when the comparison signal 712 is low. The comparison signal 712 also drives a negative driver 710. The negative driver 710 connects the A output 506 to V− when the comparison signal 712 is low and disconnects the A output 506 from V− when the comparison signal 712 is high.

Because of the gain of the input comparator 702 stage, the trim controller of FIG. 7 allows for the use of small signal and linear analog trim sensors 108. The input comparator 702 circuit may include hysteresis to prevent oscillation of the input comparator 702 or to prevent excessive activity of the A output 506 in the presence of small trim sensor 108 signal variations. The positive driver 706 or negative driver 710 may be a switch type circuit comprising a relay, or transistor or FET or other such element.

Figure 8:
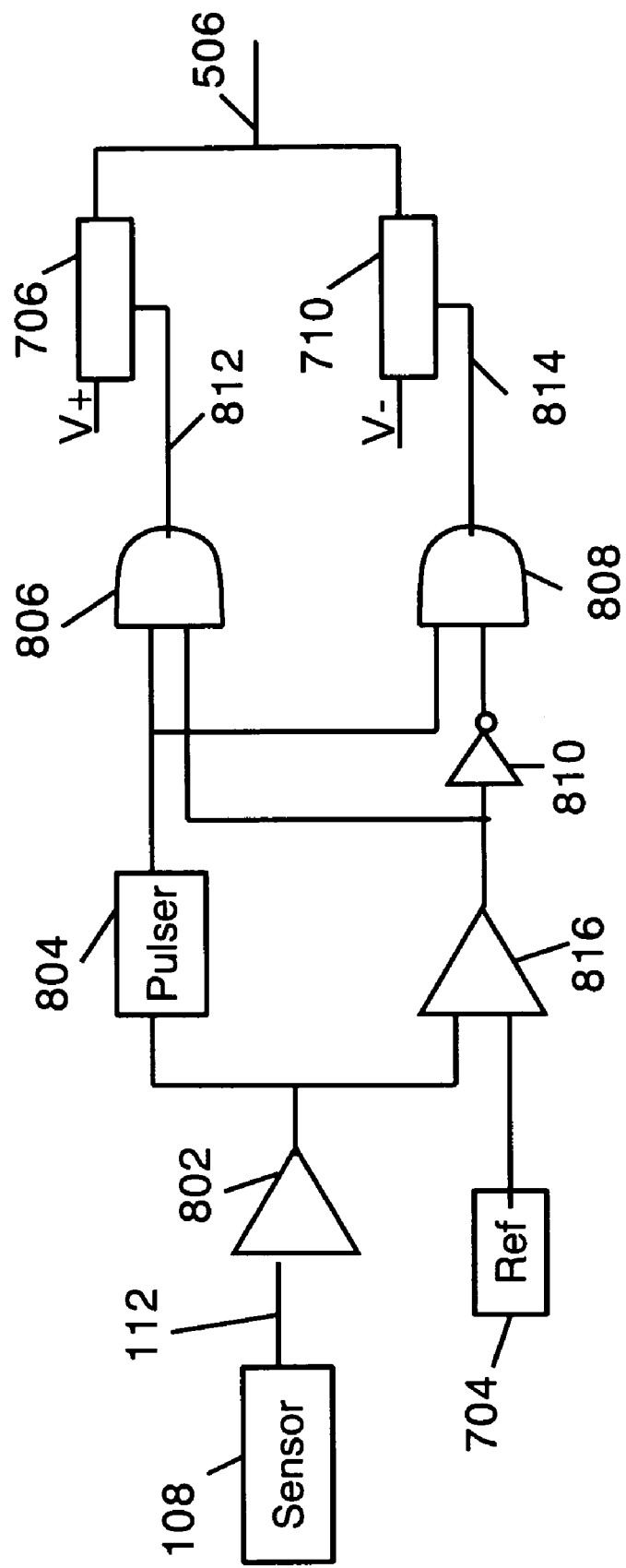
FIG. 8 is a block diagram of an embodiment of a trim controller including a pulsed output in accordance with the present invention.

FIG. 8 is a block diagram of another embodiment of a trim controller in accordance with the present invention. Referring to FIG. 8, a sensor, such as sensor A 108 is coupled to an optional input amplifier 802, which may provide gain an may include a dead zone. The output of the input amplifier 802 drives a pulse generator 804, or pulser. The pulse generator 804 delivers a pulsed output with a duty cycle proportional to the magnitude of the sensor signal. The polarity of the sensor signal is detected by a polarity comparator 816. If the polarity of the signal is positive, the pulse generator 804 signal is passed through a first AND gate 806, producing a positive drive signal 812 which drives the positive driver 706. The positive driver 706 connects the A output 506 to V+. If the polarity is negative, an inverter 810 enables a second AND gate 808, and the pulse generator 804 signal is passed through the second AND gate 808, generating a negative drive signal 814. The negative drive signal 814 drives a negative driver 710, which connects the A output 506 to V−.

Since the trim servo 116 essentially integrates the effect of multiple pulses, the pulse length and pulse repetition frequency are not critical. Pulse lengths of 50 ms to 1 sec have been successfully tested.

An advantage of the pulsed output as compared to a continuous output is that the trim may operate more slowly with a given motor and gear train and thus produce less wear on the trim servo 116. Several methods may be used to vary the duty cycle including pulse frequency modulation, pulse length modulation or a combination of both.

An advantage of the pulsed output as compared to a linear output is that the output driver may be a switch and thus need not dissipate significant heat, resulting in a smaller package and higher reliability.

Figure 9:
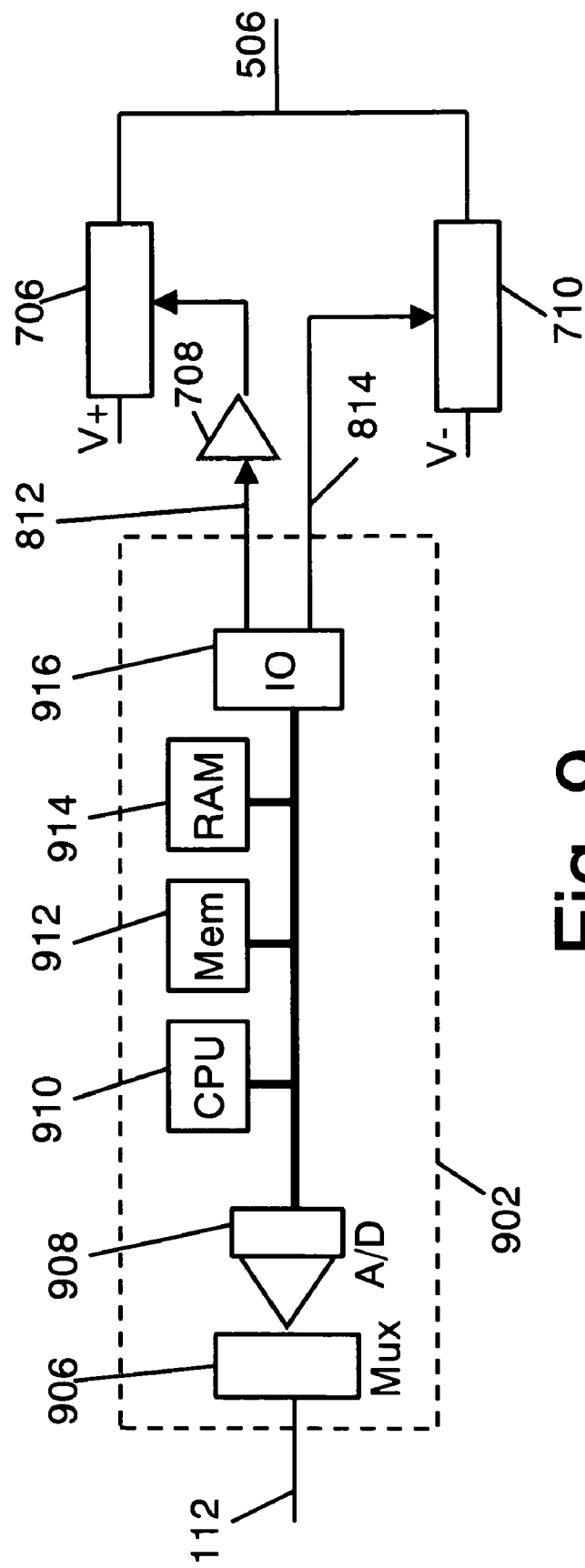
FIG. 9 is a block diagram of one embodiment of a trim controller including a microcontroller.

FIG. 9 is a block diagram of one embodiment of a trim controller including a microcontroller 902. Referring to FIG. 9, a trim signal is input through an analog multiplexer 906 to an analog to digital converter 908 (A/D converter 908). The digital value of the trim signal is provided to a CPU 910 via a data bus. The CPU 910 utilizes the digital trim signal value to compute an output logic value for the positive drive signal 812 and negative drive signal 814 to control the positive driver 706 and negative driver 710. The output logic value is computed using a program stored in program memory 912 and data stored in data memory 914. The output logic value is delivered by writing to a memory mapped IO location 916.

A microcontroller 902 type suitable for this application is the MC68HC705P6 processor. The MC68HC705P6 is used by way of example only. Other processors with different architectures may also be adapted to serve this function.

Referring again to FIG. 9. When the positive drive signal 812 is high, a level shift stage 708 drives the positive driver 706, connecting V+ to the A output 506. When the negative drive signal 814 is high, the negative driver 710 connects V− to the A output 506. The software program stored in the microcontroller 902 insures that the positive driver 706 and the negative driver 710 are not turned on simultaneously.

Figure 10:
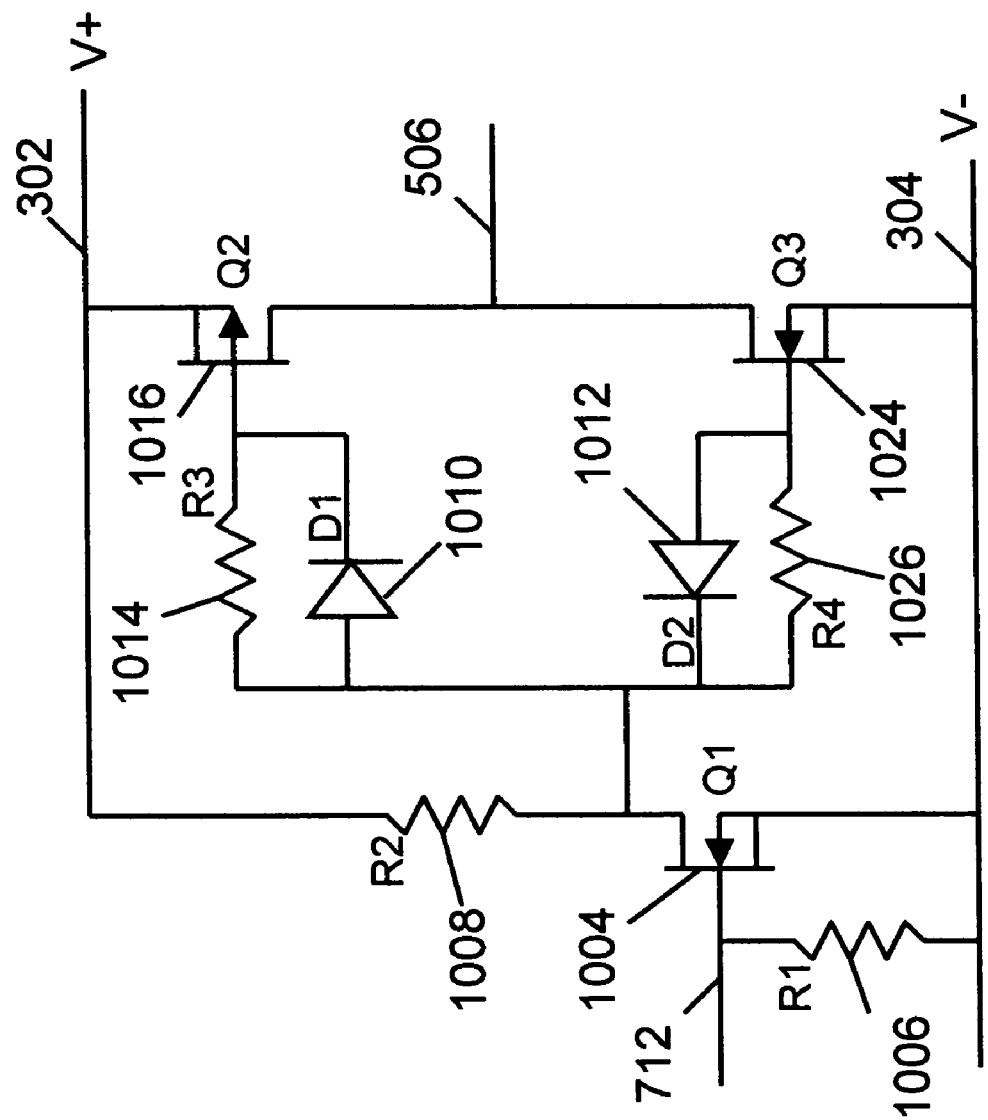
FIG. 10 is an exemplary output circuit which may be used in the system of FIG. 7.

FIG. 10 is an exemplary output circuit which may be used in the system of FIG. 7. Referring to FIG. 10, the positive supply 302, V+ is 12v and the negative supply 304, V− is ground or zero volts. The comparison signal 712 drives a level shift stage 708 comprising transistor 1004, resistor 1006, and resistor 1008. The level shift stage 708 receives the comparison signal 712 as a zero to 5v logic signal and delivers a zero to 12v output to drive the positive driver 706 and negative driver 710 stages. The positive driver 706 and negative driver 710 stages comprising transistor 1016 and transistor 1024 respectively. Diode1 1010 and Diode2 1012 together with resistor 1014 and resistor 1026 insure that both transistor 1016 and transistor 1024 are not turned on simultaneously. Due to finite switching times, it is otherwise possible to turn on both transistor 1016 and transistor 1024 simultaneously for a few microseconds.

Assuming initially that transistor 1004 is off, thus the drain of transistor 1004 would be high or 12v and transistor 1016 would be off, transistor 1024, on. When transistor 1004 is switched on, transistor 1024 gate capacitance charge is immediately discharged through diode2 1012, turning off transistor 1024 rapidly. However, Diode1 1010 is reverse biased requiring the gate capacitance of transistor 1016 to drain through resistor 1014. Thus transistor 1016 is delayed in turning on.

Similarly, when transistor 1004 turns off, transistor 1016 gate capacitance charging time is limited only by resistor 1008; whereas transistor 1024 gate capacitance must charge through both resistor 1008 and resistor 1026. Transistor 1016 turns off rapidly; whereas transistor 1024 is delayed turning on. Thus, for logic transitions in either direction, both transistors, transistor 1016 and transistor 1024, are turned off before either one is turned on.

Figure 11:
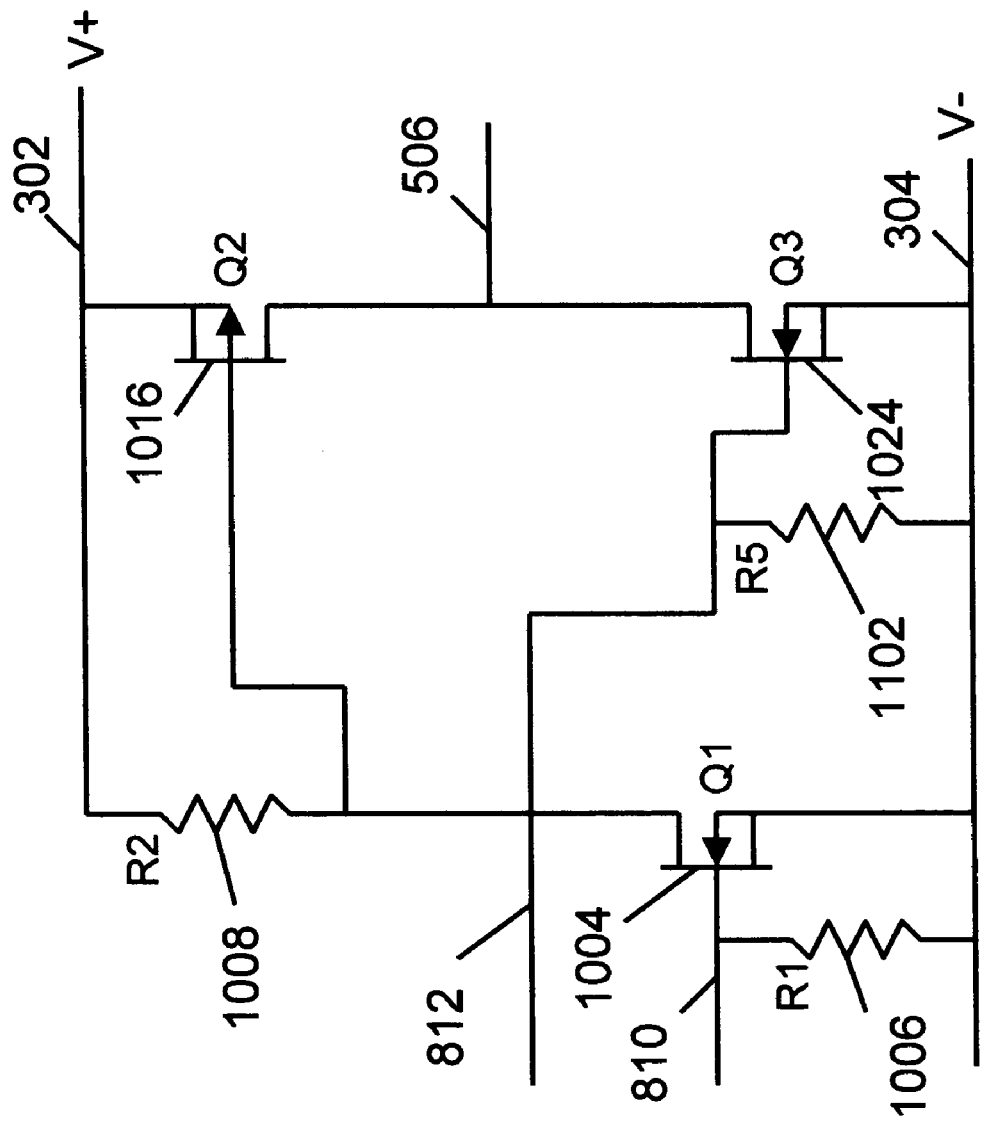
FIG. 11 is an exemplary output circuit which may be used in the system of FIG. 8 or FIG. 9.

FIG. 11 is an exemplary output circuit which may be used in the system of FIG. 8 or FIG. 9. Referring to FIG. 11, the circuit of FIG. 111 has two independent inputs—one for the positive driver 706, comprising transistor 1016 and one for the negative driver 710 comprising transistor 1024. The negative drive signal 814 input is directly connected to the gate of transistor 1024. Resistor 1102 guarantees that transistor 1024 will be turned off if the signal 812 driver is in a high impedance state, such as a microcontroller 902 reset state. A high signal on the gate of transistor 1024 turns on transistor 1024, connecting the negative supply 304 to the A output 506.

The positive drive signal 812 is first fed to transistor 1004 which level shifts the signal to the gate of transistor 1016. A high signal on the gate of transistor 1004 drives the gate of transistor 1016 to the V− rail and turns on transistor 1016, connecting the positive supply 302 to the A output 506. Resistor 1006 is provided to insure that transistor 1004 and transistor 1016 are in an off state if the driver for signal 810 is in a high impedance state. Because the two inputs 812 and 810 are independent, the driving device and in particular, the software routine in the microcontroller 902 must insure that both inputs 810 and 812 are not turned on simultaneously.

Figure 12:
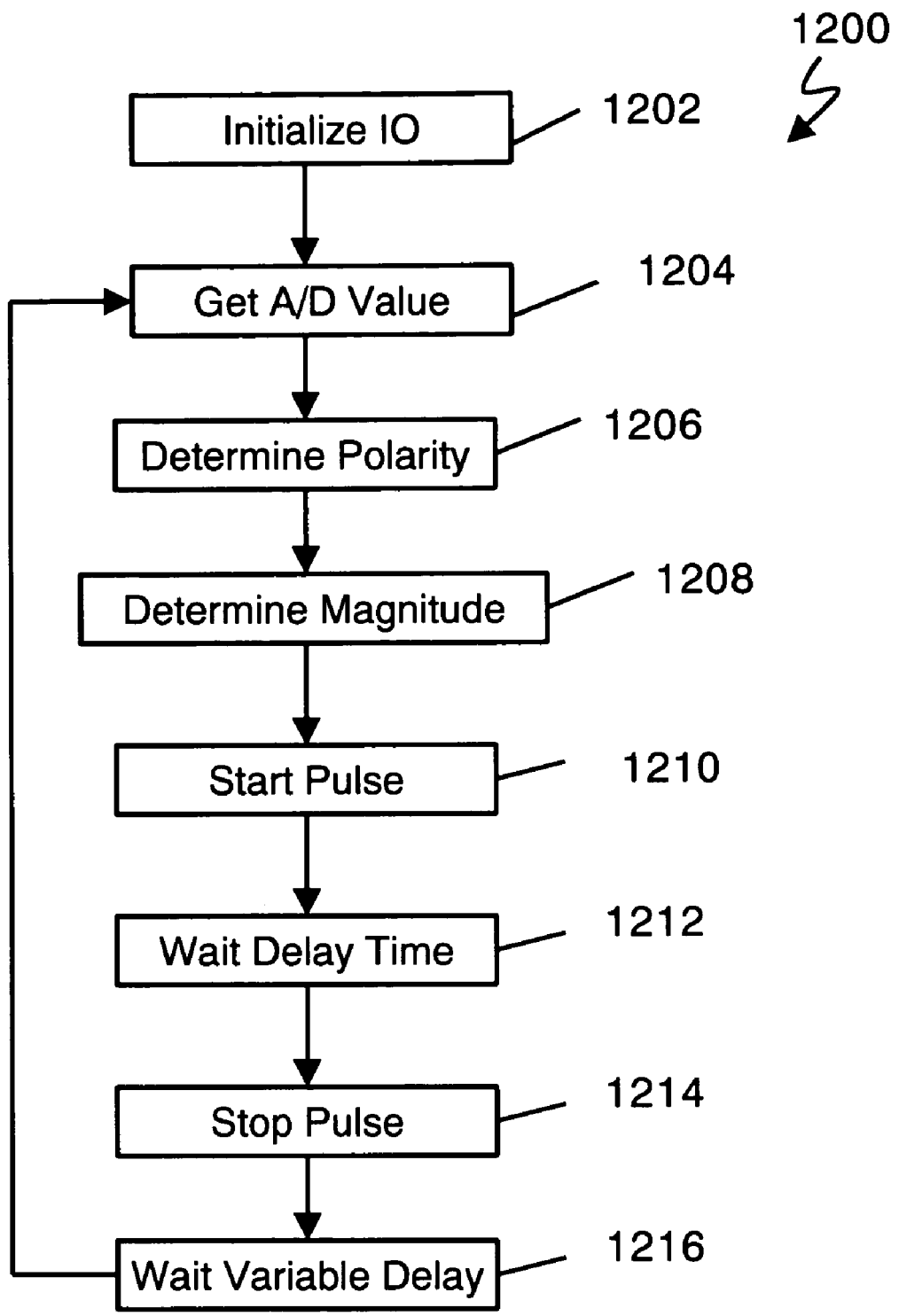
FIG. 12 is a flow diagram for an exemplary software routine for the microcontroller of FIG. 9.

FIG. 12 is a flow diagram for an exemplary software routine for the microcontroller 902 of FIG. 9. Referring to FIG. 12, the routine of FIG. 12 1200 begins upon processor reset. The first step 1202 is to initialize the IO ports and set IO directions. The output signals are set to signal low to turn off both the positive and negative output drivers.

In the next step 1204, the sensor input is selected and an A/D conversion is initiated. The result is stored in memory and used to determine polarity, step 1206, and magnitude, step 1208. Polarity and magnitude are determined with respect to the force represented by the signal, i.e., tension may be positive while compression may be negative. In one exemplary embodiment, the sensor signal spans from zero to +5v with +2.5v representing zero force or torque. +5v represents full scale compression and zero V represents full scale tension. Thus, in this example, signals below 2.5v would be determined to be negative polarity and signals above 2.5v would be positive polarity. The magnitude, in this example, is the absolute value of the difference between the measured signal and 2.5v.

Once polarity and magnitude are determined, the pulse is started in step 1210 by writing a 1 to the output bit for the appropriate driver according to the determined polarity of the sensor signal. Thus, for positive polarity, the positive driver 706 is selected by writing a 1 to the bit representing the positive driver 706, taking care not to also pulse the negative driver 710 simultaneously.

Note that the polarity relationships are given by way of example only. The actual polarity required to give the correct response may be different from one installation to another. The polarity depends on where the trim sensor is installed in the linkage train, the inherent polarity of the trim sensor, the trim servo 116 polarity and possibly other devices, depending on the installation. To accommodate these variations, a polarity reversing switch may be provided at any one or several of the polarity determining devices.

After the pulse is started, the microcontroller 902 generates a fixed delay in step 1212 by entering a loop with a fixed number of iterations. Once the fixed delay is completed, control passes to step 1214, where the output bit for the pulse is reset to zero to turn off the output driver (positive driver 706 and negative driver 710) and thereby stop the pulse.

In step 1216 the processor generates a variable delay, which is inversely related to the magnitude of the force or torque sensed by the trim sensor. Thus pulse repetition rate is directly related to the magnitude of the trim sensor signal. In one embodiment, the variable delay is achieved by a delay loop that repetitively adds the magnitude to an accumulator until a limit value is achieved. For example, if the magnitude is one and the limit value is 1000, 1000 iterations are necessary to achieve the limit. But if the magnitude is 2, only 500 iterations are necessary, taking half the time. Thus, a larger magnitude results in a shorter delay time and a higher pulse repetition frequency.

At the completion of the variable delay, control returns to step 1204, the step of retrieving a new A/D value.

In another embodiment, the A/D value is refreshed several times in the variable delay loop to respond to signal changes more quickly. In still another embodiment, the pulse width delay is also a variable delay. In another embodiment, the total time for the pulse time and intervening off time is fixed and the duty cycle is varied.

In another embodiment, step 1216 may be a fixed delay, resulting in a fixed servo speed when the trim signal is outside the dead zone.

In a further embodiment, the duty cycle is increased over time and may not be a proportional to trim signal magnitude. When the trim signal changes direction or drops within an optional dead zone, the duty cycle is set to a low value (within the optional dead zone, the duty cycle is zero). When the trim signal rises out of the dead zone (if used) the duty cycle gradually increases until the next trim signal reversal or the trim signal is within the dead zone. Thus, servo activity in steady state flight is minimized while allowing faster response to changing flight conditions.

Now, for a general discussion of the various trim controller embodiments. The trim controllers of FIGS. 7, 8, and 9, although described with reference to trim controller A 502, may be used as trim controller B 504 with appropriate change of inputs and outputs. Note also that the trim controllers for a given system need not be the same type. Indeed, it may be advantageous to use the microcontroller 902 based trim controller as trim controller A 502 and use the analog controller of FIG. 7 as trim controller B 504. Using the analog trim controller as 502 one trim controller avoids the complexity of a dual microcontroller 902 design. In one embodiment, trim controller A 502 may be a microcontroller 902 based trim controller, which may include the features of pulsed output, center off region, and proportional control; whereas trim controller B 504 may be a switch or may be an analog trim controller as in FIG. 7, having little more than a polarity determining function.

Figure 13A:
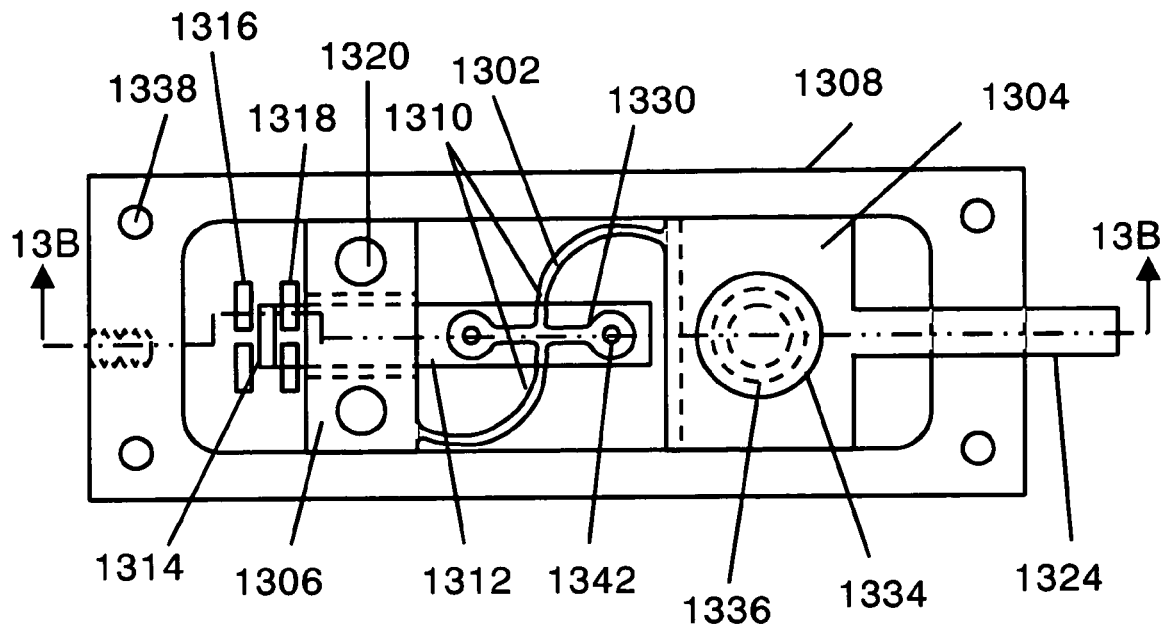
FIG. 13A is a detail drawing of an exemplary trim sensor constructed in accordance with the present invention.

Turning now to a discussion of the trim sensors, FIG. 13A is a detail drawing of an exemplary trim sensor constructed in accordance with the present invention. The trim sensor of FIG. 13A is adapted to measure the control force 102 as an axial tension or compression force, also called the load. Force sensing is based on observing the flexing of a spring 1302 using an optical sensor 1318. The spring 1302 is mounted in a housing 1308 machined from an aluminum block. The housing 1308 may alternatavely be cast or made from other materials. The spring 1302 is attached to the housing 1308 at a fixed end 1304 using a pair of attachment screws 1320. A sliding end 1306 of the spring 1302 is allowed to move freely in an axial direction to allow for the flexing of the spring 1302. The control force 102 is coupled through the housing 1308 to the spring 1302 through the fixed end 1304 and directly coupled through the sliding end 1306. A threaded coupling 1322 is provided in the housing 1308 to facilitate load coupling. The sliding end 1306 includes a bar portion 1324 for load coupling. A rod end bearing or rod extension are typically attached to each end, thus forming a link assembly. The bar portion 1324 may be rounded and threaded to facilitate attachment of rod end bearings or other coupling devices. The link assembly may be used, for example, to couple a control servo 404 to the primary aircraft control linkage 104 for the associated control surface 106, as shown in FIG. 6.

The spring 1302 of FIG. 13A includes a transverse portion 1310 that runs at least partially transverse or laterally with respect to the direction of the force to be measured. The transverse portion 1310 includes an arm attachment structure 1330 for attaching a sensor arm 1312 to the transverse portion 1310 to couple motion of the transverse portion 1310 to the sensor arm 1312. One end of the sensor arm 1312 is attached to the transverse portion 1310 of the spring 1302 for receiving motion coupled from the transverse portion 1310. The other end, a sensor end 1332, of the sensor arm 1312 drives a motion or position detector. Suitable detectors include, but are not limited to, optical, magnetic, electromagnetic, capacitive, and mechanical switch type detectors.

As shown in FIG. 13A, the arm attachment structure 1330 comprises two extensions of the spring 1302 material on either side of the spring 1302 at the center of the spring 1302. Each extension includes a wide portion at the end of the extension and a hole for receiving an arm screw 1342 or other fastener.

Alternate spring attachment structures 1330 may be used including but not limited to: 1) a single widened portion of the spring 1302 with a hole for receiving a screw; 2) a clamp-on structure; 3) a glue-on structure; 4) or the like.

The exemplary embodiment shown in FIGS. 13A–13D includes an optical position sensor. The optical position sensor comprises an optical vane 1314, an optical source 1316 and an optical sensor 1318. The optical vane 1314 is positioned on the sensor end 1332 of the sensor arm 1312 and may be attached to the sensor arm 1312 or may be a portion of the sensor arm 1312 or may be formed by bending a portion of the sensor arm 1312. The optical vane 1314 is positioned between the optical source 1316 and the optical sensor 1318 so as to partially restrict the light passing from the source to the sensor. The optical source 1316 may be an LED or incandescent bulb or other such optical source 1316. The optical sensor 1318 may be a photodiode or phototransistor or other optical sensor 1318. The optical sensor 1318 and optical source 1316 are mounted to a cover 1326 which is attached with cover 1326 screws.

In operation, a force input to the spring 1302 flexes the spring 1302, rotating the transverse portion 1310 of the spring 1302, which causes the sensor arm 1312 to rotate. Rotation of the sensor arm 1312 moves the optical vane 1314 through the optical path, varying the light passing from the optical source 1316 to the optical sensor 1318, resulting in a change in the output signal. As shown in FIG. 13A two sets of optical sources 1316 and optical sensors 1318 are provided to allow the optical sensor 1318 to include a response dead zone.

A further feature of the embodiment shown in FIG. 13A is a limit stop bushing 1334 to limit the travel of the sliding end 1306 of the spring 1302 to prevent damage to the spring 1302 and to prevent the sensor link 612 from breaking apart under overload of the spring 1302. The limit stop bushing 1334 is a stepped bushing 1334 with a first diameter 1344 fitting within a guide hole 1336 in the sliding end 1306 of the spring 1302 to limit the sliding movement of the spring 1302. The range of sliding movement is limited to the difference between the first diameter 1344 of the bushing 1334 and the diameter of the guide hole 1336. For example, in one embodiment, the bushing 1334 has a first diameter 1344 of 4 mm and the guide hole 1336 has a diameter of 6 mm, resulting in a total range of 2 mm flex range of the spring 1302. A second diameter 1346 of the bushing 1334 is larger than the guide hole 1336 in the sliding end 1306 to hold the sliding end 1306 captive and prevent overturning of the sliding end 1306. The bushing 1334 may be held using a guide screw 1340 by threading the bushing 1334 or by providing a nut 1348.

Figure 13B:
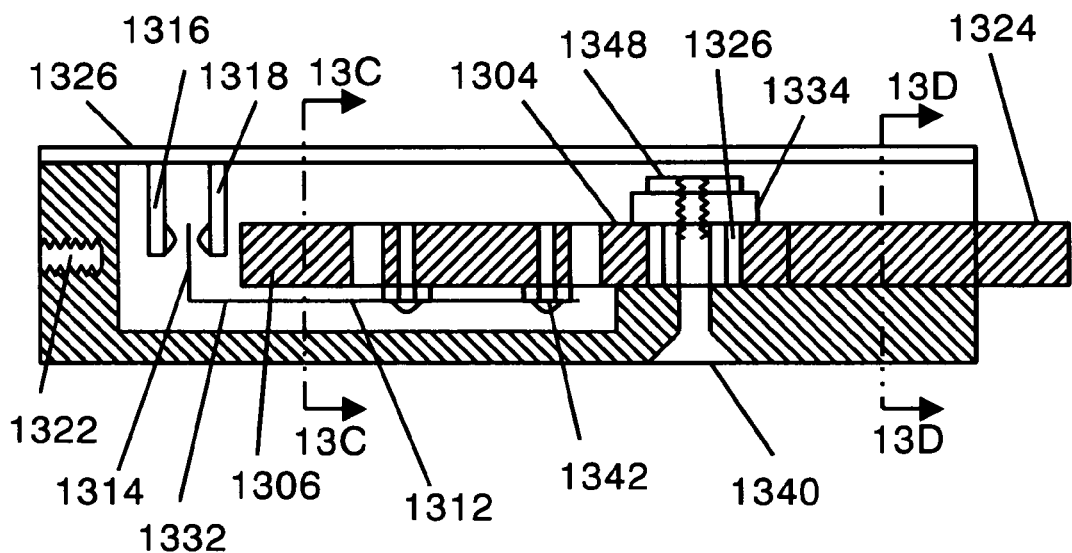
FIG. 13B is an offset section drawing of the trim sensor of FIG. 13A.

FIG. 13B is an offset section drawing of the trim sensor of FIG. 13A. The section line 13B—13B shown in FIG. 13A follows the center of the trim sensor except in the region of the optical sensors 1318 where the section line is offset to show the optical sensors 1318. FIG. 13B shows more clearly the relationship of the housing 1308 and spring 1302. The sensor arm 1312 is attached to the spring 1302 using a screw. The optical sources 1316 and optical sensors 1318 are mounted on the cover 1326. The cover 1326 is attached to the top of the housing 1308.

Figure 13C:
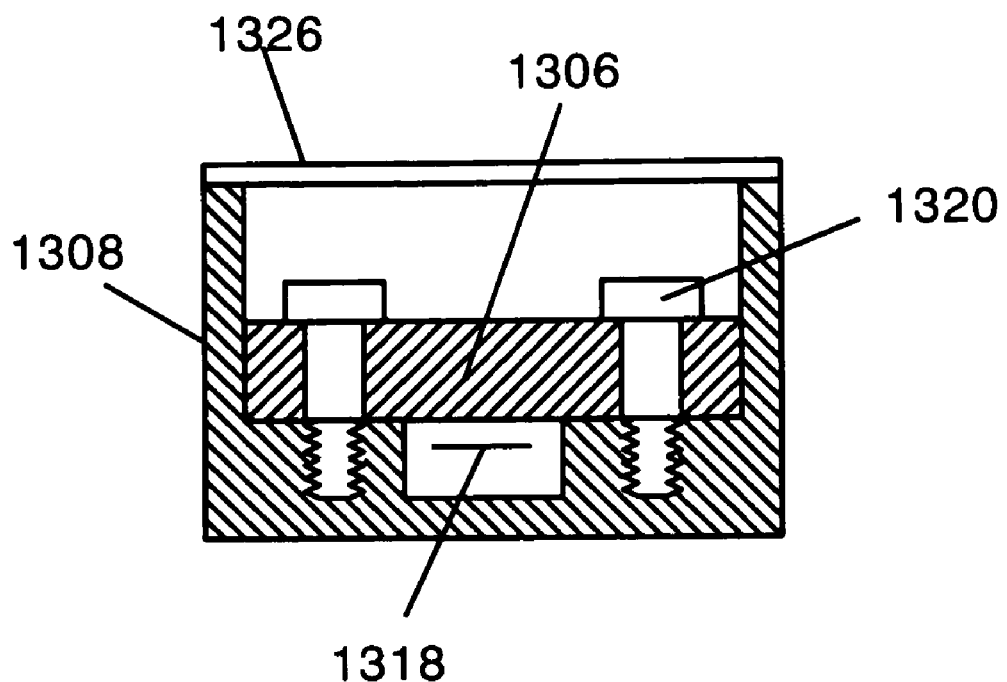
FIG. 13C and FIG. 13D are a section view of the sensor of FIG. 13A.

FIG. 13C is a section view of the sensor as shown in FIG. 13B. FIG. 13C shows the positioning of the spring 1302 in the housing 1308 and the positioning of the sensor arm 1312 and vane 1314 relative to the optical sources 1316 and optical sensors 1318.

Figure 13D:
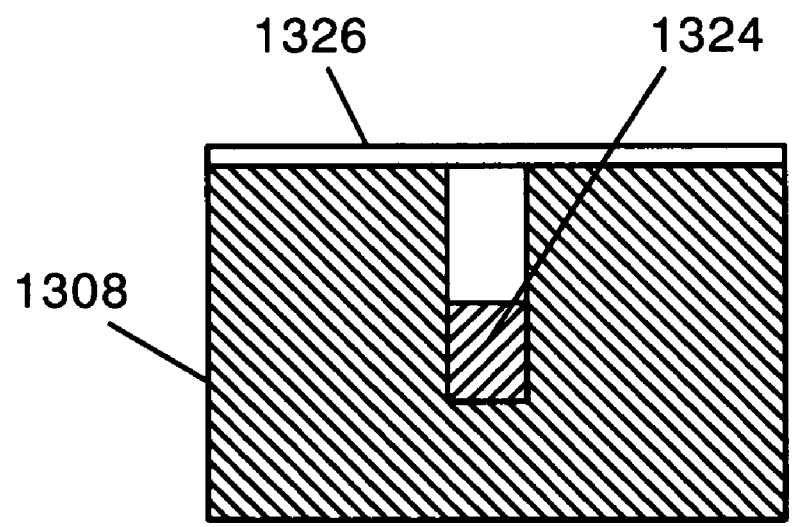

FIG. 13D is a section view of the sensor as shown in FIG. 13B. FIG. 13D shows the housing 1308 and bar portion 1324 and a slot for inserting the spring 1302 assembly into the housing 1308.

Figure 14A:
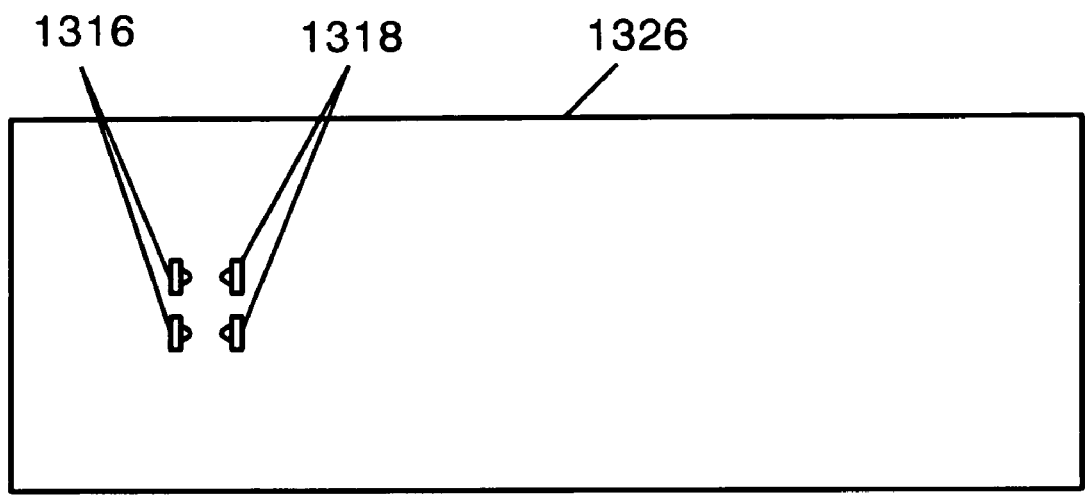
FIGS. 14A–14F show the components of FIG. 13A.

FIGS. 14A–14F show the components of FIG. 13A. FIG. 14A shows the top cover 1326 with the optical sources 1316 and optical sensors 1318 mounted thereon. The top cover 1326 may include printed wiring to interconnect the sensors and may include other components and/or an attachment for an electrical cable.

Figure 14B:
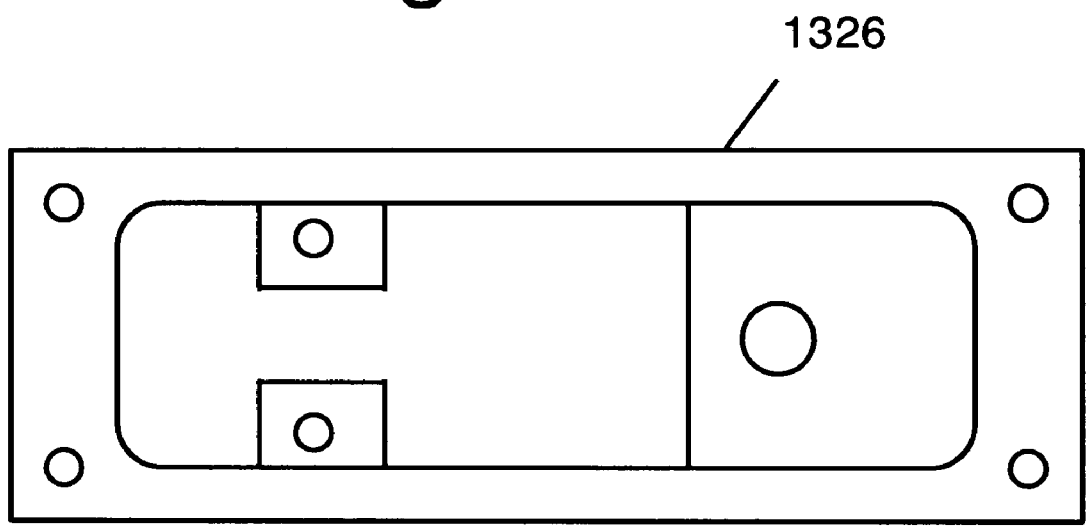

FIG. 14B shows the housing 1308, which may be made of aluminum or other suitable material.

Figure 14C:
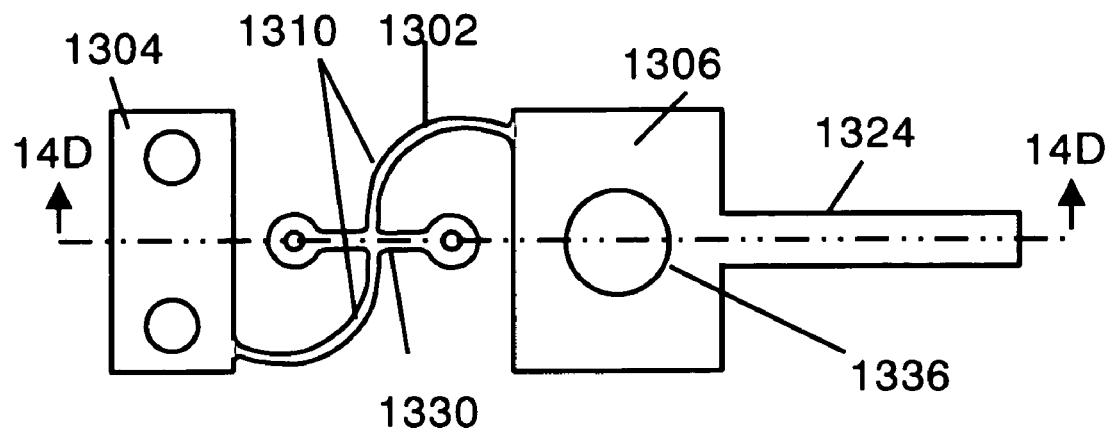

FIG. 14C shows the spring 1302 including the components: the fixed end 1304, sliding end 1306, sensor arm 1312, attachment structure 1330, mounting holes, guide hole 1336, and load coupling bar portion 1324. The spring 1302, together with components shown in FIG. 14C may be fabricated as a single part by laser cutting from steel plate. 4130 steel or stainless steel are suitable materials. Other flexible materials with suitable spring 1302 and strength properties may be used. After cutting, the spring 1302 may be heat treated for best spring characteristics. In an alternate embodiment, the spring 1302 and ends may be made of separate materials and joined by suitable processes or mechanisms.

Figure 14D:
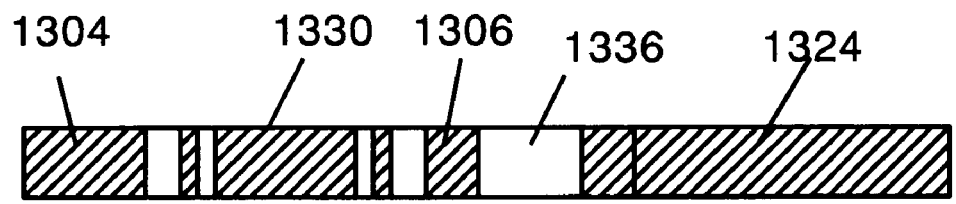

FIG. 14D is a section drawing as indicated in FIG. 14C showing the fixed end 1304, attachment structure 1330, sliding end 1306 and bar portion 1324.

Figure 14E:
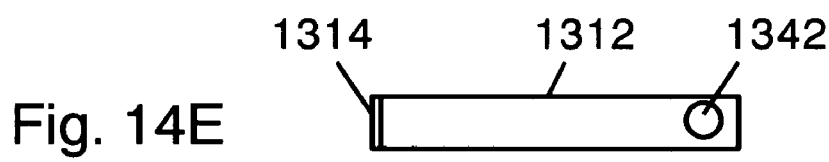

FIG. 14E shows the sensor arm 1312 and optical vane 1314. The sensor arm 1312 may be any suitable rigid material and may be attached using a screw, rivet, glue or the like.

Figure 14F:
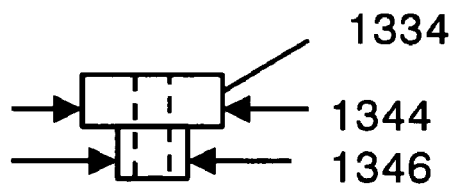

FIG. 14F is a section drawing of the guide bushing 1334 showing the first diameter 1344 and second diameter 1346.

Figure 15:
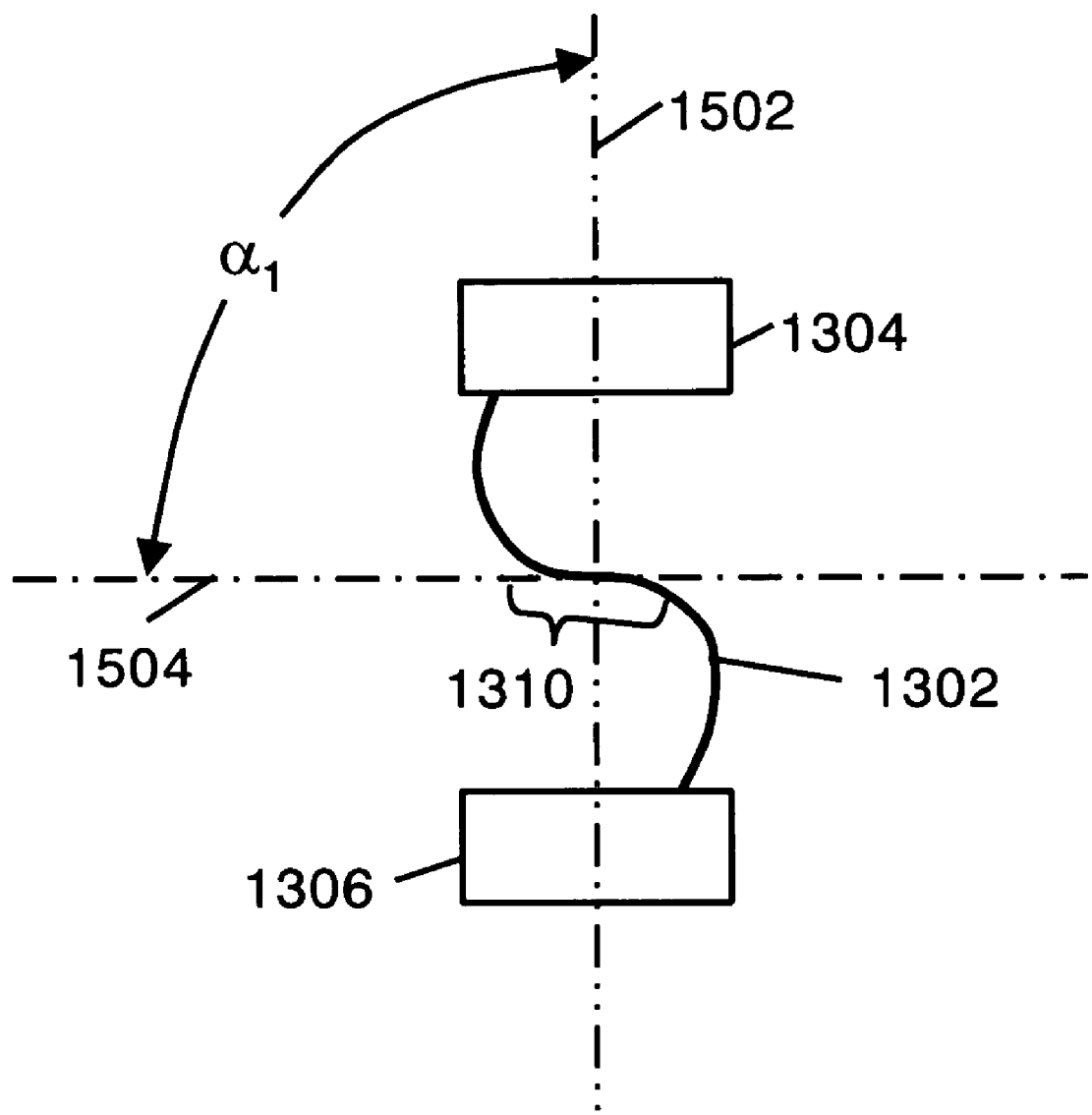
FIG. 15 illustrates a spring angle α1.

FIG. 15 illustrates a spring 1302 angle $\alpha 1$. Referring to FIG. 15, the spring 1302 including the fixed end 1304 and the sliding end 1306 are oriented along the direction of force to be measured, which is the sensor axis 1502. The transverse portion 1310 of the spring 1302 is oriented substantially along a tangent line 1504, tangent to a center line of the spring 1302 in the region where the vane 1314 is coupled to the spring 1302. The tangent line 1504 of FIG. 15 and sensor axis 1502 forms the spring angle, $\alpha 1$. The spring angle, α1, may be an acute angle, a right angle, or an obtuse angle. Force along the trim sensor axis 1502 will cause the spring 1302 to bend, resulting in rotation of the transverse portion 1310. The rotation of the transverse portion 1310 is coupled to the sensor arm 1312 and sensed by the optical sensor 1318.

FIGS. 16A–16H illustrate alternative spring 1302 shapes in accordance with the present invention. FIG. 16A represents the shape illustrated in FIGS. 13, 14, and 15. The remaining figures, FIGS. 16B–16H illustrate alternative shapes, including alternative spring 1302 angles and attachment points. The spring 1302 may also be made in three dimensions including a coiled spring 1302 (not shown).

Figure 17A:
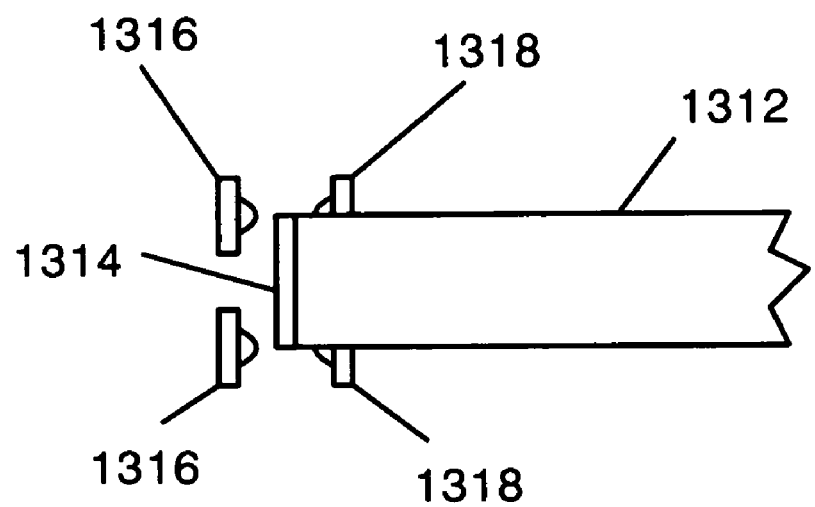
FIG. 17A and FIG. 17B illustrate the details of an optical sensor and vane in accordance with the present invention.
Figure 17B:
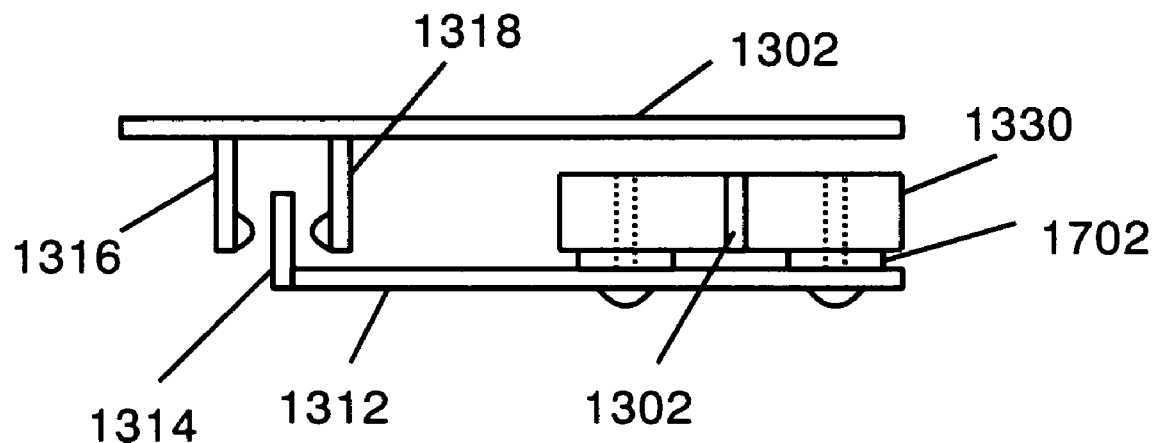

FIG. 17A and FIG. 17B illustrate the details of an optical sensor 1318 and vane 1314 in accordance with the present invention. Referring to FIG. 17A, the sensor arm 1312 includes the optical vane 1314 which is positioned to occlude a portion of the light along a path from the optical source 1316 to the optical sensor 1318.

Referring to FIG. 17B, the sensor arm 1312 is mounted on the spring 1302 using a screw and spacer 1702. The sensor arm 1312 includes the optical vane 1314 positioned between the optical source 1316 and optical sensor 1318. The optical source 1316 and optical sensor 1318 are mounted on the cover 1326.

Figure 18:
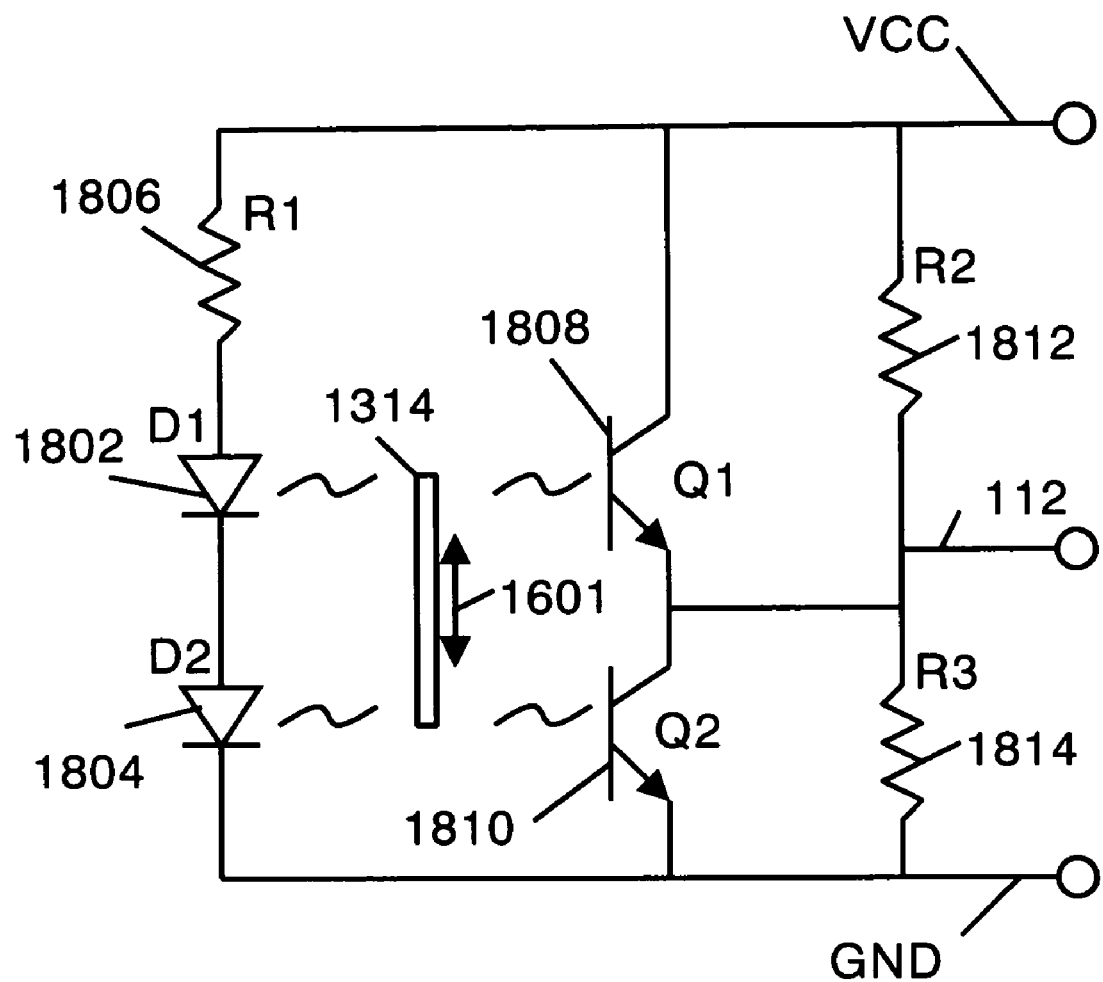
FIG. 18 is a schematic diagram showing the optical source and sensors of FIG. 17.

FIG. 18 is a schematic diagram showing the optical source 1316 and optical sensors 1318 of FIG. 1 Referring to FIG. 18, the optical sources 1316 are LED 1802 and LED 1804 driven from VCC, +5volts. The optical sensors 1318 are phototransistor 1808 and phototransistor 1810 configured in series and loaded by resistor 1812, and resistor 1814. In operation, the optical path from LED 1802 to phototransistor 1808 is partly occluded by the optical vane 1314. Also, the optical path from LED 1804 to phototransistor 1810 is partly occluded by the optical vane 1314. When the optical vane 1314 is in a center position, the optical paths are equally occluded, producing equal phototransistor currents. Thus, the sensor output signal 112 is determined by the resistor divider resistor 1812 and resistor 1814, which are typically equal in resistance value, resulting in an output voltage of ½ Vcc. If the optical vane 1314 moves up in FIG. 18, the optical vane 1314 will further occlude the path from LED 1802 to phototransistor 1808 and open the path from LED to phototransistor 1810. The transistor currents will become unbalanced, sinking more current into phototransistor 1810 from the resistor divider network and lowering the sensor output signal 112 voltage. Thus, the sensor output signal 112 is responsive the applied force input.

One feature of the arrangement of FIG. 18 is that a dead zone in the response can be generated by making the optical vane 1314 longer such that it substantially or essentially completely occludes both optical paths when the vane 1314 is in the center position. Thus, in the center position, the sensor output signal 112 is determined by the resistor divider network, resistors 812 and 814. A small movement is required in either direction to begin to open one of the optical paths to generate a phototransistor current and begin to change the sensor output signal 112. The region of the small movement is the region of reduced sensitivity, or dead zone.

In an alternative embodiment, a single optical source 1316 and single optical sensor 1318 may be used. A single sensor arrangement may be generated as a subset of the schematic of FIG. 18 by eliminating resistor 1812 and phototransistor 1810. Eliminate LED 1804 and connect LED 1802 from resistor 1806 to V−. The single sensor arrangement may be simpler, but may be more temperature sensitive since the arrangement is not balanced at the center vane 1314 position.

Figure 19A:
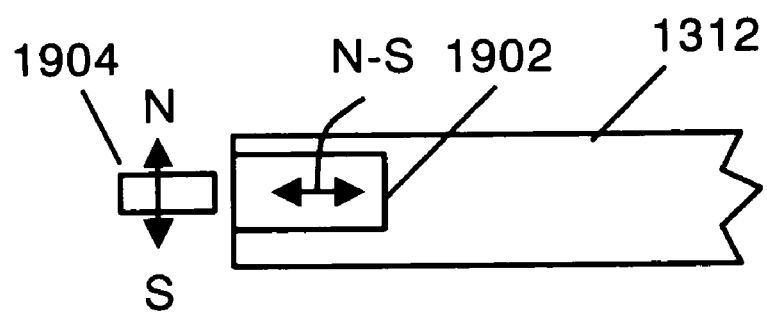
FIGS. 19A–19C illustrate an alternative embodiment using a magnetic sensor.
Figure 19B:
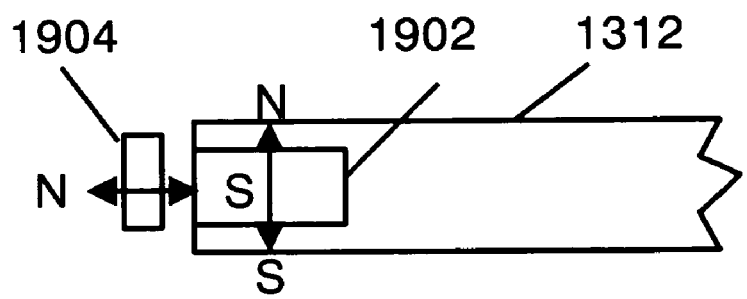
Figure 19C:
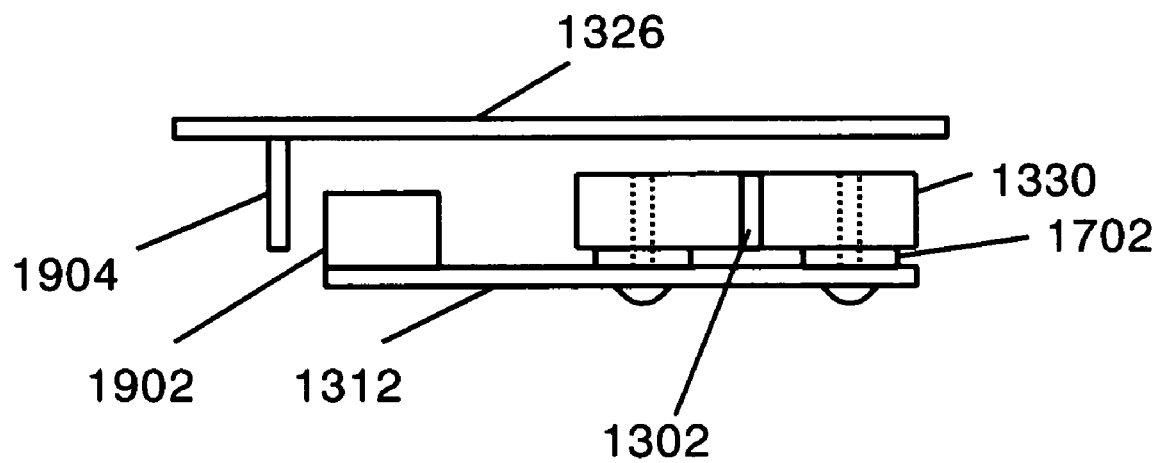

FIGS. 19A–19C illustrate an alternative embodiment using a magnetic sensor 1904. Referring to FIG. 19A, a magnet 1902 is mounted on the end of the sensor arm 1312. The magnetic direction of the magnet 1902 is parallel to the length of the sensor arm 1312. A Hall effect magnetic sensor 1904 is positioned near the magnet 1902 with a sensing axis perpendicular to the magnetic axis of the magnet 1902. When the sensor arm 1312 is in a center position, no magnetic field is sensed by the magnetic sensor 1904. As the sensor arm 1312 is deflected, the magnetic vector will shift from perpendicular and a magnetic field will be sensed, producing an output from the sensor.

FIG. 19B shows an alternative magnetic arrangement. Referring to FIG. 19B, the magnet 1902 is mounted to the end of the sensor arm 1312 with the magnetic axis perpendicular to the length of the sensor arm 1312 and parallel to the axis of deflection of the sensor arm 1312. The magnetic sensor 1904 is mounted near the magnet 1902, again with the sensing axis perpendicular to the magnet 1902. Operation is the same as in FIG. 19A.

FIG. 19C is a side view of FIGS. 19A and 19B. FIG. 19C shows the mounting of the magnetic sensor 1904 to the cover 1326 and the mounting of the magnet 1902 to the end of the sensor arm 1312.

Figure 20A:
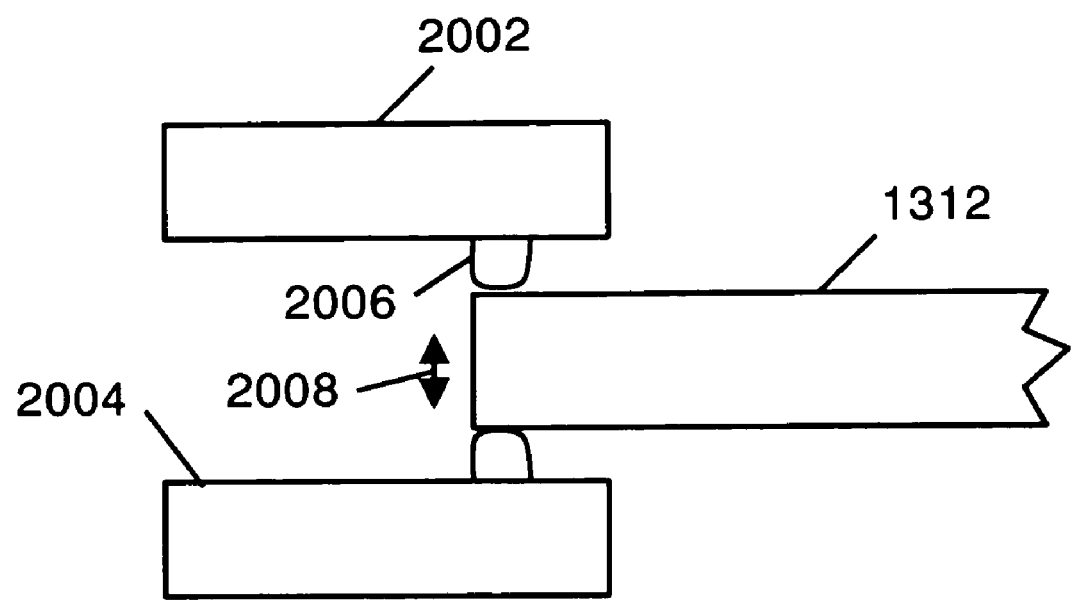
FIG. 20A and FIG. 20B illustrate an alternative embodiment of the trim sensor of FIG. 13 utilizing a switch.
Figure 20B:
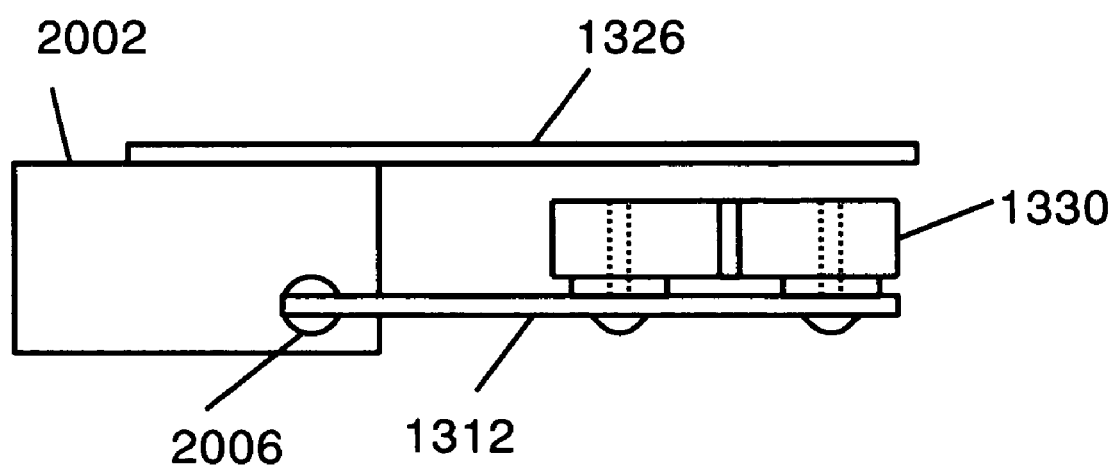

FIG. 20A and FIG. 20B illustrate an alternative embodiment of the trim sensor 108 of FIG. 13 utilizing a switch. Referring to FIG. 20A, two switches, SwitchA 2002 and SwitchB 2004, are positioned at the end of the sensor arm 1312 so that lateral arm motion 2008 of the sensor arm 1312 will actuate either SwitchA 2002 or SwitchB 2004 by depressing switch actuating button 2006.

FIG. 20B is a side view of FIG. 20A showing one of the switches mounted to the cover 1326 and the sensor arm 1312 positioned to actuate the switch. The switching sensor arrangement of FIGS. 20A and 20B may be employed in the system of FIG. 3.

Figure 21:
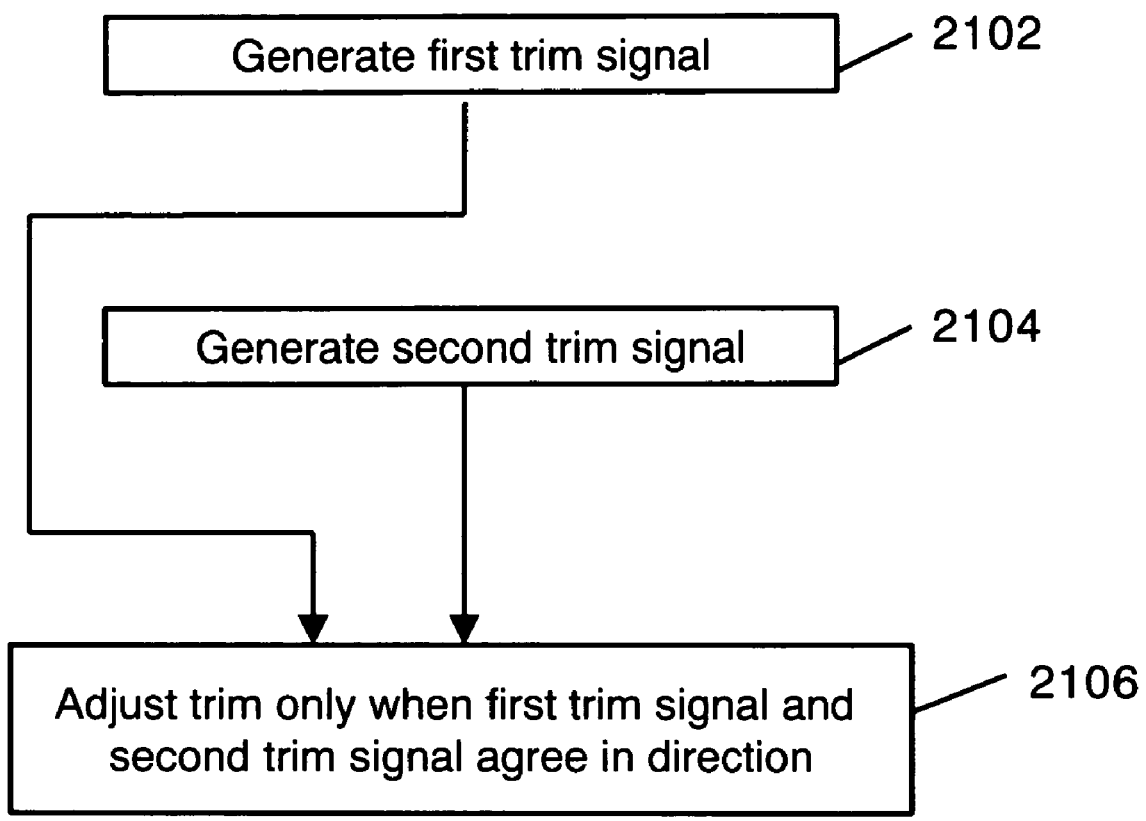
FIG. 21 illustrates a method for providing trim.

FIG. 21 illustrates a method for providing trim. Referring to FIG. 21, in step 2102, a first trim signal is generated. The first trim signal may be from a first trim sensor, such as trim sensor A 108. In step 2104, a second trim signal is generated. The second trim signal may be from a second trim sensor, such as trim sensor B 110. The first trim signal and second trim signal are preferably independent such that a failure causing an error in one of the trim signals will not cause, or will not be related to, a failure in the other trim signal. In step 2106, the trim is adjusted according to the trim signals only when both of the trim signals agree in direction. Thus, when the two trim signals agree that the residual force on the control surface 106 is, for example, an upward force on the control surface 106, the trim servo 116 adjusts the position of the trim tab 118 in a direction to reduce the residual force. When the two trim signals disagree in direction, or when one or both trim signals are in a zero region, the trim servo 116 remains in a constant position.

CONCLUSION

The previous description of the preferred embodiments is provided to enable any person skilled in the art to make or use the present invention. While the invention has been particularly shown and described with reference to preferred embodiments thereof, it will be understood by those skilled in the art that various changes in form and details may be made therein without departing from the spirit and scope of the invention.

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A system for adjusting a trim device associated with a control surface in an aircraft, said aircraft having a primary control system; said system for adjusting the trim device comprising:
a control servo mechanically coupled to said primary control system through a coupling link; said coupling link comprising a push pull rod disposed between said control servo and said primary control, through said push pull rod said control servo is operatively coupled to said primary control system;
a first trim sensor within said coupling link, said first trim sensor producing a first trim signal responsive to a control force transmitted through said coupling link;
a trim servo responsive to said first trim signal for adjusting said trim device in accordance with said first trim signal.

2. A system as in claim 1, wherein said first trim sensor comprises:
a flexible portion having a flexing response to said control force;
a flexing response sensor producing said first trim signal responsive to said flexing response of said flexible portion;
wherein the flexing of said flexible portion acts on a member mechanically connected to said flexible portion to produce a rotational motion in said member in response to said control force, and said flexing response sensor coupled to said member.

3. A system as in claim 2, wherein the flexing response sensor includes two optical sensors spaced apart to generate a response dead zone.

4. A system as in claim 2, wherein the flexing response sensor includes a switch.

5. A system as in claim 1, wherein said first trim sensor includes a switch.

6. A system as in claim 1, wherein said first trim signal includes a response portion that is proportional to said control force.

7. A system as in claim 1, wherein said first trim signal includes a response portion having hysteresis.

8. A system as in claim 1, wherein said first trim signal includes a response portion having a dead zone.

9. A system as in claim 1, wherein said link is coupled to a primary control cable.

10. A system as in claim 9, wherein said link is coupled through a cable attaching device comprising a bar.

11. A system as in claim 1, further including a second trim sensor, said second trim sensor producing a second trim signal; said trim servo being responsive to said second trim signal; wherein said first trim sensor and said second trim sensor are separate and independent.

12. A system as in claim 11, wherein said trim servo adjusts said trim device only when said first trim sensor and said second trim sensor agree in direction.

13. A system as in claim 11, wherein said second trim sensor is included in said coupling device.

14. A system as in claim 11, wherein said second trim sensor is included in said control servo.

15. A system as in claim 14, wherein said second trim sensor is an electronic sensor.

16. A system as in claim 11, wherein said second trim sensor is an electromechanical sensor.

17. A system as in claim 11, wherein one of said first trim sensor or said second trim sensor provides direction information.

18. A system as in claim 17, wherein one of said first trim sensor or said second trim sensor includes a switch.

19. A system as in claim 1, including a first trim controller; said first trim controller responsive to said first trim sensor, and said trim servo responsive to said first trim controller.

20. A system as in claim 19, wherein said first trim controller provides a pulsed output to drive said trim servo; said pulsed output having a variable duty cycle that yields an average output drive proportional to said first trim signal.

21. A system as in claim 19, wherein said first trim controller is responsive only to the polarity of said first trim signal.

22. A system as in claim 19, wherein said first trim controller includes a hysteresis response to said first trim signal.

23. A system as in claim 19, wherein said first trim controller includes a dead zone response to said first trim signal.

24. A system as in claim 19, wherein said first trim controller provides an output proportional to said first trim signal.

25. A system as in claim 24, wherein said first trim controller output is a pulsed output having a variable duty cycle wherein the variable duty cycle is proportional to said first trim signal.

26. A system as in claim 19, further including a signal from an autopilot wherein said first trim controller adjusts the trim device only when said autopilot signal is present.

27. A system for adjusting a trim device associated with a control surface in an aircraft, said aircraft having a primary control system; said system for adjusting the trim device comprising:
a control servo coupled to said primary control system through a coupling device, said coupling device comprising a link;
a first trim sensor within said coupling device, said first trim sensor producing a first trim signal responsive to a control force transmitted through said coupling device;
a flexible portion having a flexing response to said control force;
a flexing response sensor producing said first trim signal responsive to said flexing response of said flexible portion;
a portion disposed transverse to the force transmitted through said coupling device, said transverse portion coupled to said flexible portion and responsive to said flexing response, and said flexing response sensor coupled to said transverse portion;
a trim servo responsive to said first trim signal for adjusting said trim device in accordance with said first trim signal.

28. A system for adjusting a trim device associated with a control surface in an aircraft, said aircraft having a primary control system; said system for adjusting the trim device comprising:
a control servo coupled to said primary control system through a coupling device;
a first trim sensor within said coupling device, said first trim sensor producing a first trim signal responsive to a control force transmitted through said coupling device;
said first trim sensor further comprising:

a flexible portion having a flexing response to said control force;

a flexing response sensor producing said first trim signal responsive to said flexing response of said flexible portion; said flexing response sensor comprising at least one optical sensor;

a trim servo responsive to said first trim signal for adjusting said trim device in accordance with said first trim signal.

29. A system for adjusting a trim device associated with a control surface in an aircraft, said aircraft having a primary control system; said system for adjusting the trim device comprising:

a control servo coupled to said primary control system through a coupling device;

a first trim sensor within said coupling device, said first trim sensor producing a first trim signal responsive to a control force transmitted through said coupling device;

a second trim sensor included in said control servo, said second trim sensor producing a second trim signal; a trim servo being responsive to said second trim signal; wherein said first trim sensor and said second trim sensor are separate and independent;

said trim servo responsive to said first trim signal for adjusting said trim device in accordance with said first trim signal.

* * * * *